US012473149B1

(12) United States Patent
Brady

(10) Patent No.: US 12,473,149 B1
(45) Date of Patent: Nov. 18, 2025

(54) AUTOMATED MOBILE SORTATION AND DELIVERY SYSTEMS AND METHODS

(71) Applicant: Amazon Technologies, Inc., Seattle, WA (US)

(72) Inventor: Tye Brady, Southborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 17/743,914

(22) Filed: May 13, 2022

(51) Int. Cl.
*B65G 1/137* (2006.01)
*B65G 1/04* (2006.01)
*B65G 1/10* (2006.01)

(52) U.S. Cl.
CPC ........... *B65G 1/137* (2013.01); *B65G 1/0478* (2013.01); *B65G 1/10* (2013.01); *B65G 2203/0233* (2013.01); *B65G 2209/06* (2013.01); *B65G 2813/023* (2013.01)

(58) Field of Classification Search
CPC .............................. B65G 1/0478; B60P 3/007
USPC .......................................................... 414/679
See application file for complete search history.

(56) References Cited

U.S. PATENT DOCUMENTS

| | | | |
|---|---|---|---|
| 10,661,991 B2* | 5/2020 | Lindbo | E04B 1/94 |
| 11,840,169 B2* | 12/2023 | Seemüller | B60P 1/5442 |
| 11,978,012 B2* | 5/2024 | Gil | G06K 19/0723 |
| 2017/0291766 A1* | 10/2017 | Orth | G06Q 10/0832 |
| 2020/0074404 A1* | 3/2020 | Gil, Jr. | B64D 1/12 |
| 2021/0179364 A1* | 6/2021 | Zhang | B65G 1/0464 |
| 2021/0380339 A1* | 12/2021 | Austrheim | B65G 1/137 |
| 2024/0059205 A1* | 2/2024 | Farquhar | B60P 1/36 |
| 2024/0076129 A1* | 3/2024 | Stark | B65G 1/0478 |

* cited by examiner

*Primary Examiner* — Mark C Hageman
(74) *Attorney, Agent, or Firm* — Athorus, PLLC

(57) ABSTRACT

Automated mobile sortation and delivery systems may include a track or rail system positioned within a cargo area of a vehicle, a plurality of carrier robots that move along the track system, and a plurality of package or item racks that are engaged and moved by the carrier robots. The carrier robots may load and unload package racks relative to the cargo area, may sort or shuffle the package racks among a plurality of positions, and may position or place package racks at an access position to enable access to packages loaded within the package racks by associates for delivery. The automated mobile sortation and delivery systems may facilitate faster, more reliable, and more efficient delivery of packages using automated and highly organized sortation and retrieval processes, thereby reducing the time and effort associated with finding, identifying, and delivering correct packages to delivery destinations according to a delivery route or schedule.

18 Claims, 16 Drawing Sheets

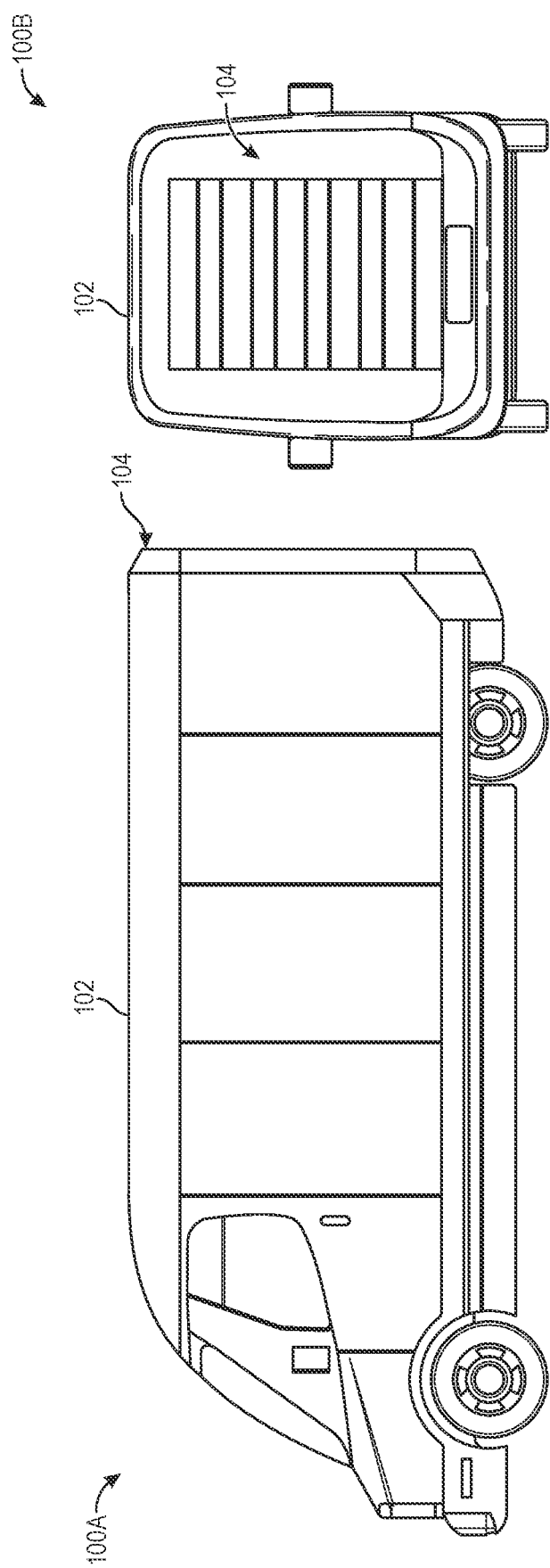

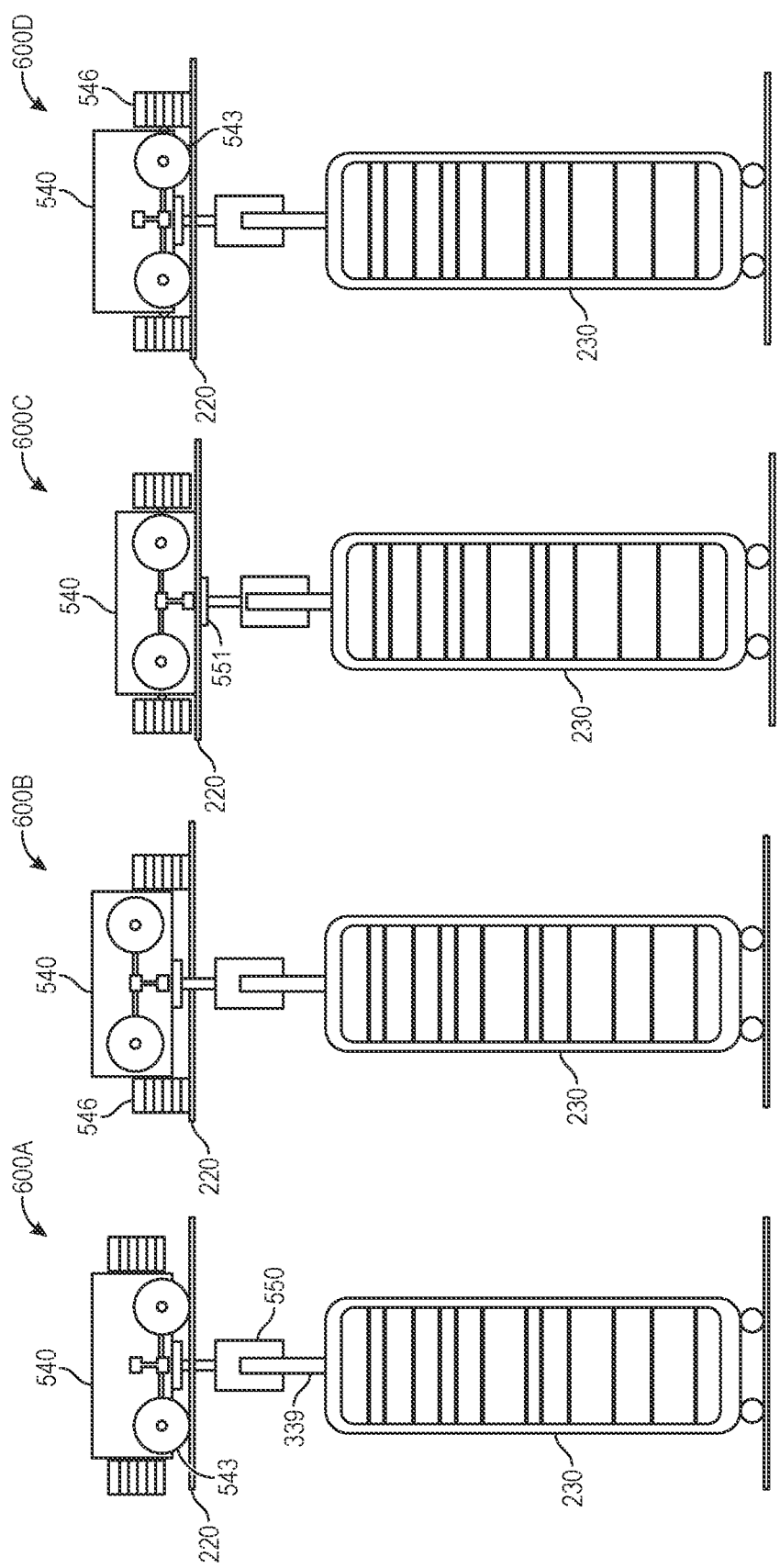

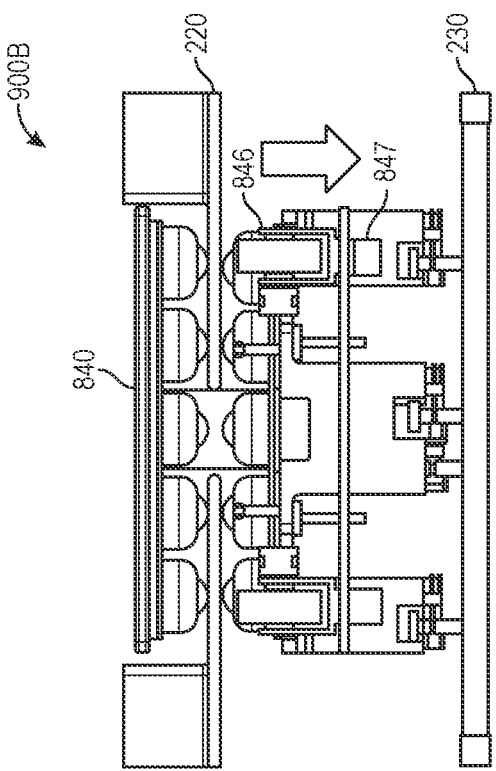
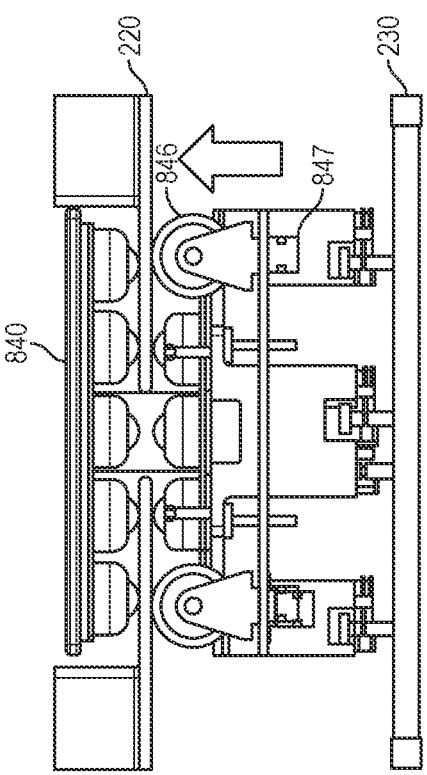
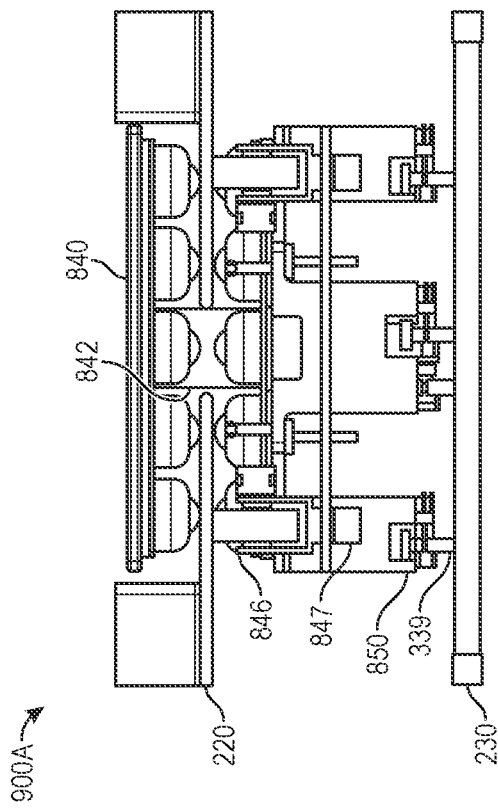
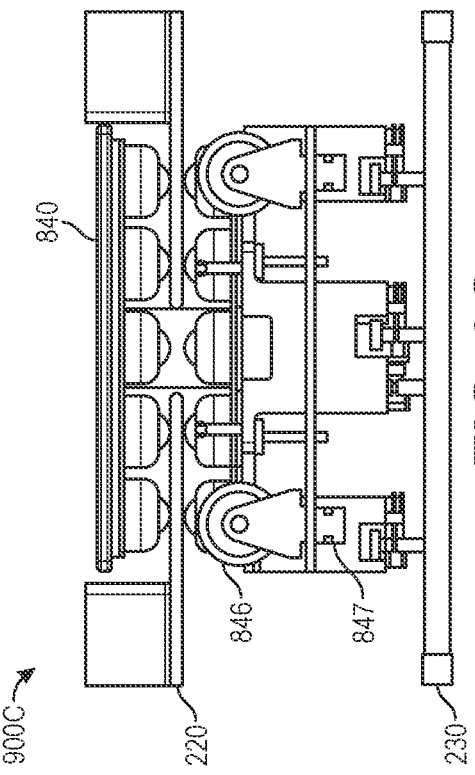

AUTOMATED MOBILE SORTATION AND DELIVERY SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various aspects of delivery systems and processes, including loading, sortation, delivery, unloading, or other processing by delivery associates, often incur significant cost and time. Accordingly, there is a need for automated systems and methods to facilitate transport and delivery processes of packages to respective destinations, thereby improving the speed and efficiency of such processes.

BRIEF DESCRIPTION OF THE DRAWINGS

FIG. 1A illustrates a schematic side view diagram of an example delivery vehicle having an automated mobile sortation and delivery system, in accordance with implementations of the present disclosure.

FIG. 1B illustrates a schematic rear view diagram of an example delivery vehicle having an automated mobile sortation and delivery system, in accordance with implementations of the present disclosure.

FIGS. 6A-6D illustrate schematic side view diagrams of example configurations of an example carrier robot, rail system, and package rack of an automated mobile sortation and delivery system, in accordance with implementations of the present disclosure.

FIGS. 9A-9D illustrate schematic side view diagrams of example configurations of another example carrier robot, rail system, and portion of a package rack of an automated mobile sortation and delivery system, in accordance with implementations of the present disclosure.

DETAILED DESCRIPTION

Figure 1C:
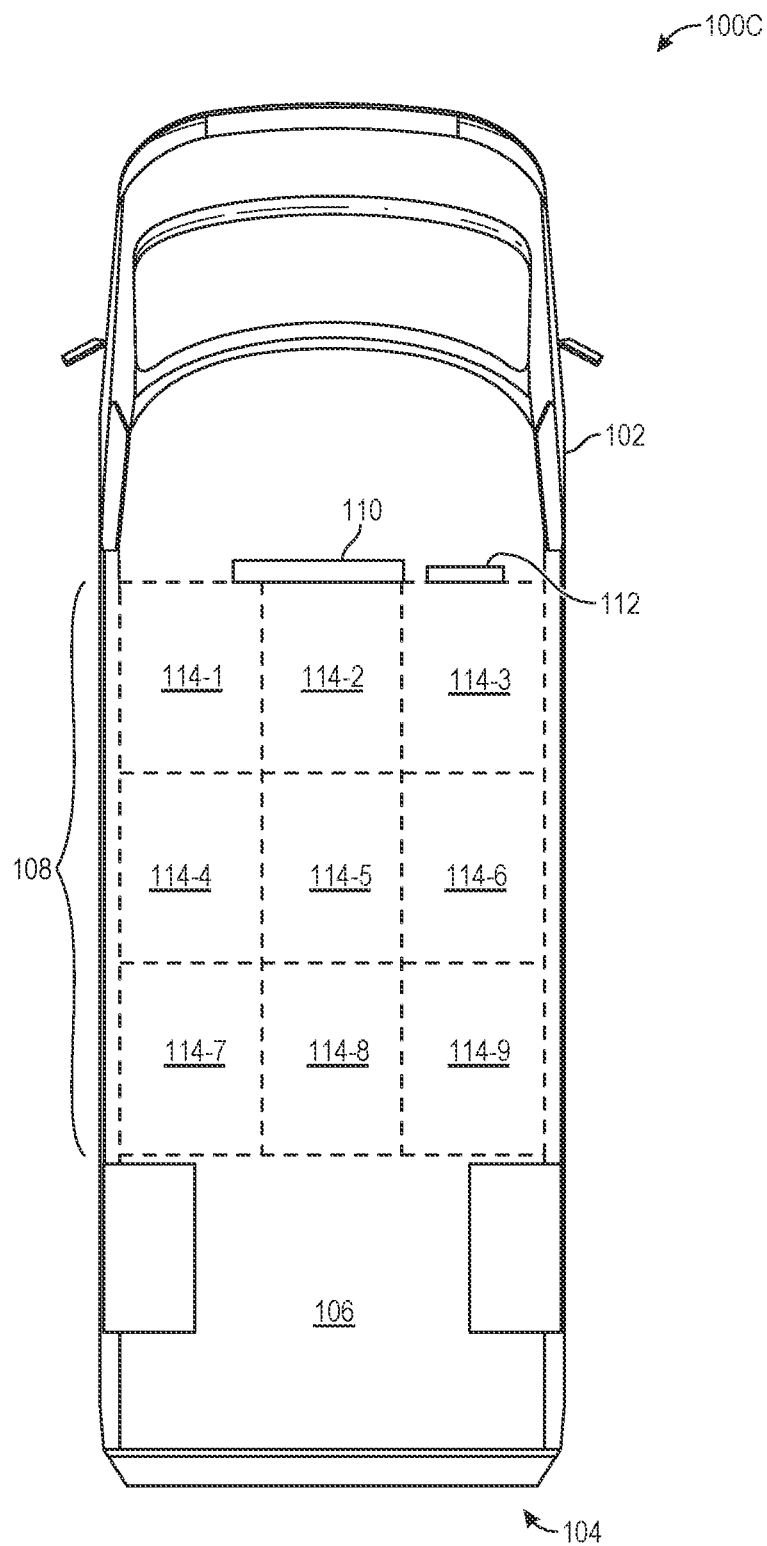
FIG. 1C illustrates a schematic top view, partial cutaway diagram of an example delivery vehicle having an automated mobile sortation and delivery system, in accordance with implementations of the present disclosure.

As is set forth in greater detail below, implementations of the present disclosure are directed to automated mobile sortation and delivery systems and methods to facilitate reliable, organized, and efficient loading, sortation, delivery, unloading, and other aspects of package delivery processes.

In example embodiments, an automated mobile sortation and delivery system may be positioned, placed, or installed within a cargo area of a vehicle, e.g., a delivery van or other delivery vehicle. The automated mobile sortation and delivery system may move and sort packages during various portions of delivery processes, as well as during transit or movement of the vehicle.

In example embodiments, the automated mobile sortation and delivery system may comprise a rail or track system to facilitate movement and sortation of packages within a cargo area of a vehicle. The rail or track system may comprise one or more rails or tracks upon which one or more carrier robots may travel or maneuver among various positions within the cargo area. In some example embodiments, the rail or track system may be positioned overhead or proximate a roof of the cargo area of the vehicle. In other example embodiments, the rail or track system may be positioned on or proximate a floor, or under a floor, of the cargo area of the vehicle.

In example embodiments, the automated mobile sortation and delivery system may also comprise one or more package or item racks having one or more package or item trays that receive and carry one or more packages or items. The package racks may be movable or rollable racks, shelves, or other structures, and the package trays may comprise individual shelves, cubbies, sheets, surfaces, or levels upon which one or more packages may be placed and stored. In addition, the packages may comprise various types of boxes, bags, or envelopes including one or more items or objects, individual items or objects, items in their original packaging, other groupings of items or objects, and/or other types of packages, items, or objects.

In example embodiments, the automated mobile sortation and delivery system may also comprise one or more carrier robots that can engage respective portions of the one or more package racks. Upon engagement, the carrier robots may move or sort the package racks among various positions within the cargo area by traveling or maneuvering along the rail or track system.

Using the automated mobile sortation and delivery systems and methods described herein, various aspects of delivery processes may be executed or performed. For example, package racks may be efficiently loaded into a cargo area of a vehicle, package racks may be automatically sorted, shuffled, or ordered among various positions within the cargo area, package racks may be dynamically moved to and made available at an access position to facilitate package delivery by an associate, package racks may be efficiently unloaded from the cargo area, package racks may be transferred between respective cargo areas of a plurality of vehicles, and/or various other aspects of delivery processes may be performed in an automated, reliable, organized, and efficient manner.

FIG. 1A illustrates a schematic side view diagram 100A of an example delivery vehicle having an automated mobile sortation and delivery system, in accordance with implementations of the present disclosure. FIG. 1B illustrates a schematic rear view diagram 100B of an example delivery vehicle having an automated mobile sortation and delivery system, in accordance with implementations of the present disclosure. FIG. 1C illustrates a schematic top view, partial cutaway diagram 100C of an example delivery vehicle having an automated mobile sortation and delivery system, in accordance with implementations of the present disclosure.

As shown in FIGS. 1A-1C, an example delivery vehicle 102 may comprise a delivery van or other type of delivery vehicle. The example delivery vehicle 102 may include a rear access door, cover, or panel 104 to allow access to a cargo area of the vehicle 102.

For example, the cargo area may include an oversize package area 106 positioned towards a rear of the vehicle 102 proximate the rear access door 104. In addition, the cargo area may include an area 108 associated with an automated mobile sortation and delivery system positioned between a cabin, e.g., including a driver's seat, of the vehicle 102 and the oversize package area 106. Moreover, the area 108 may be divided or partitioned into a plurality of positions 114 to facilitate storage, movement, sortation, and delivery of packages using the automated mobile sortation and delivery system, as further described herein.

In the example illustrated in FIG. 1C, the plurality of positions 114 may include nine positions 114-1, 114-2, 114-3, 114-4, 114-5, 114-6, 114-7, 114-8, 114-9. Furthermore, the position 114-2 may comprise an access position towards a front of the vehicle 102 to enable access, retrieval, and delivery of one or more packages to destination locations, and the position 114-8 may comprise or be located proximate a loading or unloading position towards a rear of the vehicle 102 via which packages may be loaded or unloaded using the automated mobile sortation and delivery system.

The example delivery vehicle 102 may also include an access door or opening 110 towards a front of the vehicle 102 between the cabin and the cargo area, e.g., proximate or adjacent the access position 114-2. Further, a display, monitor, touchscreen, or other visual input/output device 112 may be positioned within the cabin of the vehicle 102 and/or proximate the access door 110, in order to provide information, guidance, images, or other data to an associate who may be driving the vehicle 102 and/or delivering packages from the vehicle 102 to one or more destination locations, such as customer delivery locations.

In addition, an imaging device, scanning device, or other sensor may be associated with the visual input/output device 112 and/or positioned within the cabin to enable the associate to image, scan, or otherwise identify a retrieved package, e.g., by scanning a quick response (QR) code, barcode, or other identifier to confirm retrieval and delivery of the correct package to a customer location. For example, one or more imaging, scanning, or other sensors may be positioned within the cabin of the vehicle and may substantially automatically detect, capture, and process information associated with a retrieved package to identify and confirm retrieval of the correct package, as described in more detail in U.S. application Ser. No. 17/404,519, filed by Applicant on Aug. 17, 2021, the contents of which are herein incorporated by reference in their entirety.

Furthermore, the example delivery vehicle 102 may also include a chute, slide, basket, portal, or other aperture or opening between the cabin and an exterior of the vehicle 102, e.g., toward an upper right or upper left of the vehicle 102 illustrated in FIG. 1C. The chute, portal, or other opening may receive a retrieved package from an associate within the cabin, and may present or retain the package for retrieval and delivery by the associate (or another associate) outside the vehicle. In this manner, operational safety and ergonomics of associates may be increased or improved by avoiding associate ingress and egress relative to the vehicle while carrying or holding one or more packages.

Although FIGS. 1A-1C illustrate a particular size, shape, configuration, or arrangement of an example vehicle, other example embodiments may include other sizes, shapes, configurations, or arrangements. For example, a cargo area of a vehicle may have different sizes or shapes, the plurality of positions within the cargo area may have different sizes, shapes, or arrangements, different numbers of the plurality of positions may be associated with the automated mobile sortation and delivery system, access doors, visual input/output devices, and/or sensors may have different positions, configurations, or arrangements, and/or various other modifications may be made to portions of the example vehicle.

Figure 2A:
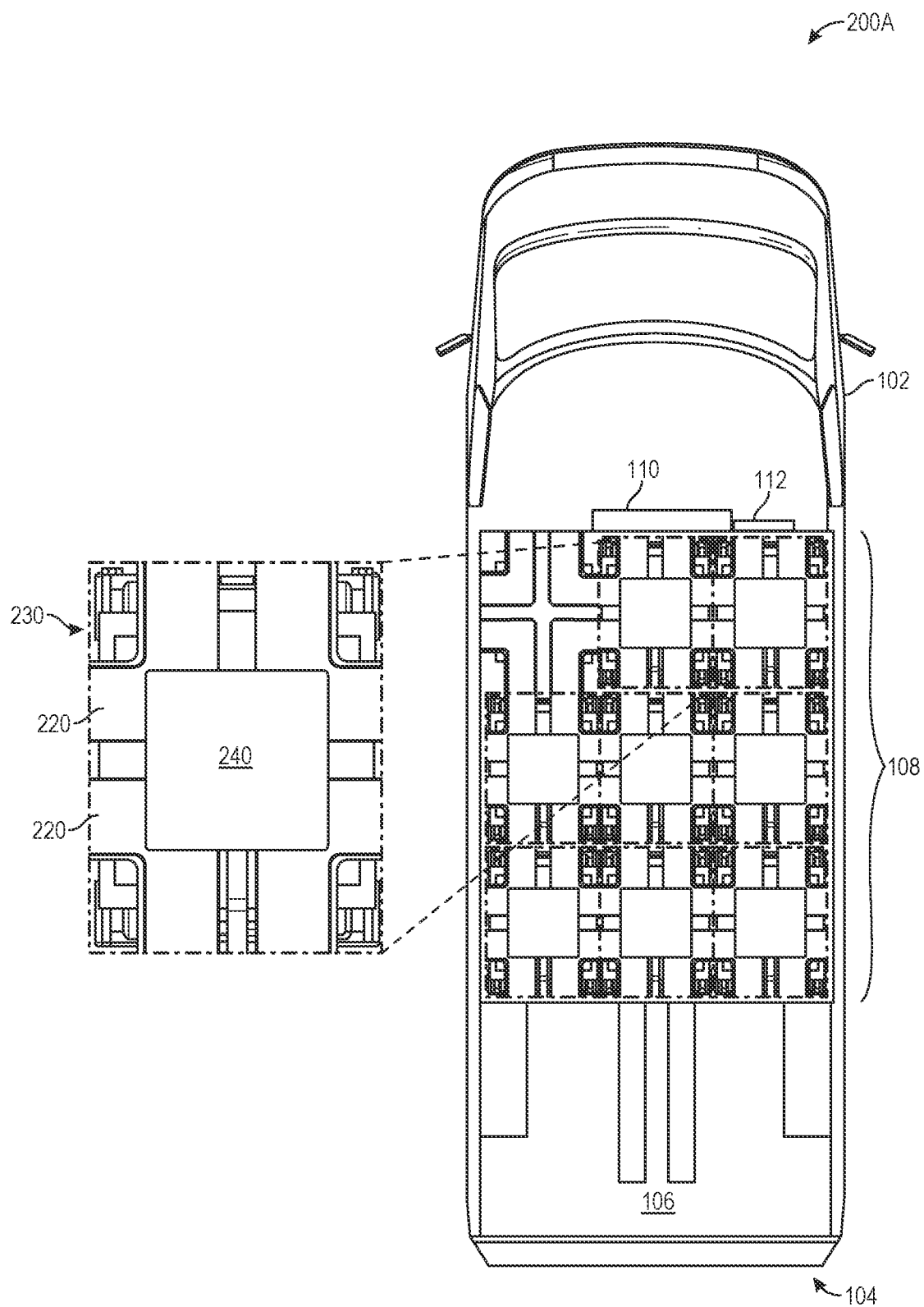
FIG. 2A illustrates schematic top view, partial cutaway diagrams of an example delivery vehicle having an automated mobile sortation and delivery system, in accordance with implementations of the present disclosure.

FIG. 2A illustrates schematic top view, partial cutaway diagrams 200A of an example delivery vehicle having an automated mobile sortation and delivery system, in accordance with implementations of the present disclosure.

As shown at the right side of FIG. 2A, an example vehicle 102 may include a rear access door 104, a cargo area with an oversize package area 106 and an area 108 associated with an automated mobile sortation and delivery system, an access door 110 towards a front of the vehicle between a cabin and the cargo area, and a visual input/output device 112 associated with or positioned within the cabin.

An example automated mobile sortation and delivery system may be positioned, placed, or installed within the area 108 of the cargo area of the vehicle 102. As schematically shown in the expanded view at the left side of FIG. 2A, the automated mobile sortation and delivery system may comprise a track or rail system 220, a plurality of package or item racks 230, and a plurality of carrier robots 240, as further described herein.

Figure 2B:
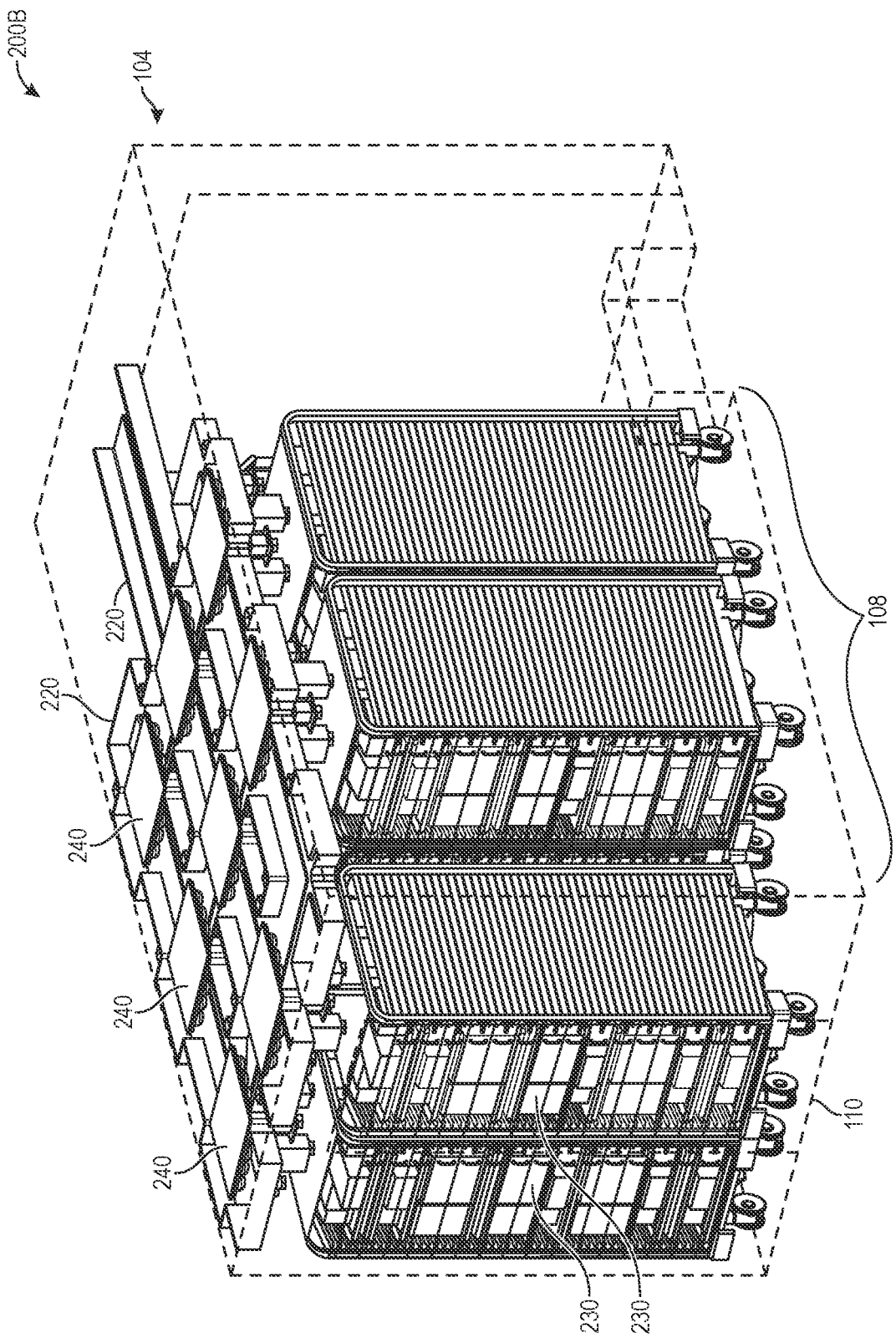
FIG. 2B illustrates a schematic perspective view diagram of an example cargo area of a delivery vehicle having an automated mobile sortation and delivery system, in accordance with implementations of the present disclosure.

FIG. 2B illustrates a schematic perspective view diagram 200B of an example cargo area of a delivery vehicle having an automated mobile sortation and delivery system, in accordance with implementations of the present disclosure.

As shown in FIG. 2B, an example automated mobile sortation and delivery system may be positioned, placed, or installed within the area 108 of the cargo area of the vehicle 102. The automated mobile sortation and delivery system may comprise a track or rail system 220, a plurality of package or item racks 230, and a plurality of carrier robots 240, as further described herein.

For example, the track or rail system 220 may be positioned overhead or proximate a roof of the cargo area, and/or installed in, coupled to, or supported by a roof and/or walls of the cargo area. The plurality of package racks 230 may comprise rollable or movable racks, shelves, or other structures that can move, roll, or slide along a floor of the cargo area. In addition, the plurality of carrier robots 240 may engage or couple to respective package racks 230, and move, sort, or shuffle the package racks 230 among the plurality of positions by traveling or maneuvering along the track or rail system 220.

In the examples of FIGS. 2A and 2B in which the automated mobile sortation and delivery system may include nine positions arranged in a three-by-three grid within the area 108, one of the positions may be maintained empty to enable movement, sortation, or shuffling of the package racks 230 by respective carrier robots 240 among the plurality of positions via the track or rail system 220. Further, the position closest to or adjacent the access door 110 may comprise an access position of the automated mobile sortation and delivery system. Also, the position closest to or adjacent the rear access door 104 may comprise, be connected to, or be proximate a loading or unloading position of the automated mobile sortation and delivery system. In example embodiments, the loading or unloading position may be positioned within and/or overlap at least a portion of the oversize package area 106 towards a rear of the vehicle 102 and proximate the rear access door 104.

Although FIGS. 2A and 2B illustrate a particular size, shape, configuration, or arrangement of an example cargo area of a vehicle, other example embodiments may include other sizes, shapes, configurations, or arrangements. For example, a cargo area of a vehicle may have different sizes or shapes, the plurality of positions within the cargo area may have different sizes, shapes, or arrangements, different numbers of the plurality of positions may be associated with the automated mobile sortation and delivery system, access doors, visual input/output devices, and/or sensors may have different positions, configurations, or arrangements, and/or various other modifications may be made to portions of the example cargo area of the vehicle. Further details of the automated mobile sortation and delivery system, e.g., track or rail system, package racks, and carrier robots, are described herein.

Figure 3:
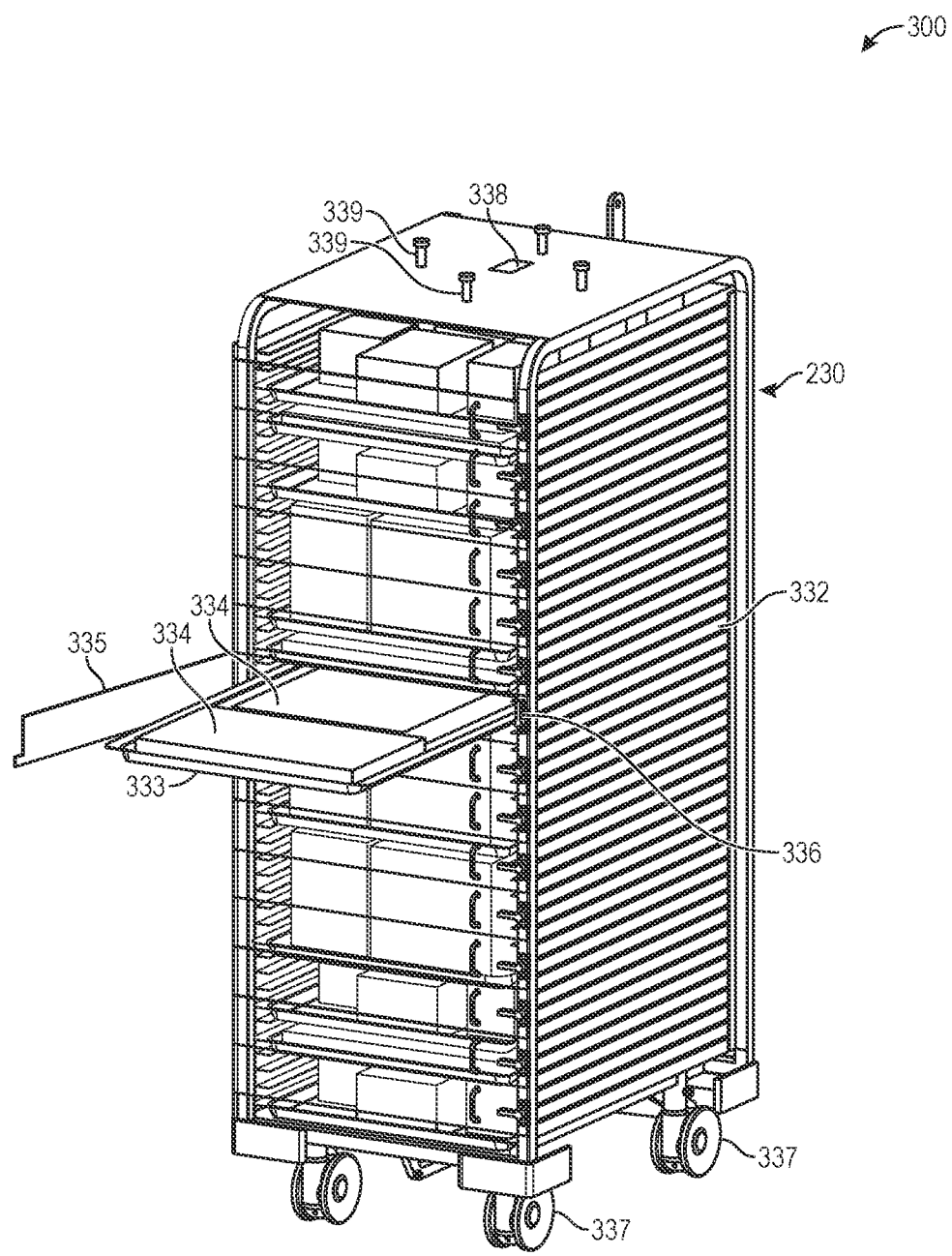
FIG. 3 illustrates a schematic perspective view diagram of an example package rack of an automated mobile sortation and delivery system, in accordance with implementations of the present disclosure.

FIG. 3 illustrates a schematic perspective view diagram 300 of an example package rack of an automated mobile sortation and delivery system, in accordance with implementations of the present disclosure.

As shown in FIG. 3, an example package or item rack 230 may comprise a rollable, slidable, or movable rack, shelf, or other structure that can move, roll, or slide along a floor of a cargo area of a vehicle. For example, the package rack 230 may have a rectangular prism shape including a plurality of lateral sides 332, e.g., four lateral sides. Other example package racks may have other shapes, such as triangular prisms, pentagonal prisms, hexagonal prisms, cylinders, or other regular or irregular shapes, and include a corresponding number of lateral sides or faces.

The package rack 230 may receive one or more package or item trays 333, and each package tray 333 may receive one or more packages or items 334. The package trays 333 may comprise shelves, cubbies, sheets, bins, surfaces, levels, or other substantially flat structures that may receive one or more packages 334 thereon. In addition, the package trays 333 may be inserted, slid, rolled, and/or removed relative to one or more vertical positions or levels within the package rack 230. Further, the package trays 333 may include one or more lips or flanges to retain packages 334 placed on the package trays, as well as to facilitate insertion and removal of the package trays 333 relative to the one or more vertical positions or levels within the package rack 230. Moreover, the package trays 333 may include pivotable or rotatable connections with portions of the package rack 230 such that package trays 333 may be moved or slid partially out and then pivoted or rotated, e.g., to allow easier access to packages 334 received by package trays 333 that are positioned at relatively higher or lower vertical positions within a package rack 230.

In example embodiments, the packages 334 may comprise various types of boxes, bags, or envelopes including one or more items or objects, individual items or objects, items in their original packaging, other groupings of items or objects, and/or other types of packages, items, or objects. In addition, the packages 334 may be loaded, sorted, or stored to individual package trays 333 based on various factors, such as size, height, weight, contents, delivery route, delivery destination, or other factors. As a result, the package trays 333, and consequently a plurality of package racks 230 having package trays 333, may be loaded with packages 334, e.g., batches or logical groupings of packages, to facilitate ergonomic, reliable, and efficient delivery along delivery routes and to delivery destinations.

In the example of FIG. 3, three of the lateral sides 332 of the package rack 230 may be substantially closed to prevent access to an interior of the package rack 230, and one side or face may include one or more doors, covers, openings, or panels 335 to allow access to an interior of the package rack 230, e.g., individual package trays 333 and associated packages 334. The doors or covers 335 may be rotated or swung open or closed via hinges, may be rolled or slid open or closed via slides, guides, or tracks, and/or may be otherwise manipulated to move between open and closed positions. In some example embodiments, the doors or covers 335 may substantially prevent falling out of packages 334 from package trays 333, e.g., during driving or navigation of a vehicle. In addition, interior faces or surfaces of the lateral sides 332 may include grooves, slots, channels, guides, slides, rollers, or other features to facilitate insertion, removal, sliding, pivoting, or other manipulation of package trays 333 at one or more vertical positions or levels within the package rack 230.

In addition, one or more latches, hooks, stops, or other retaining elements 336 may be associated with the package trays 333 and/or the doors or covers 335 to prevent unintentional removal or opening thereof. For example, the latches 336 may comprise rotatable fingers, toggles, or stops to selectively block or allow movement of package trays, doors, or covers, movable hooks, straps, or elastic retainers to selectively retain or release package trays, doors, or covers, magnets, detents, keyed slots, or other elements to mechanically or frictionally retain or hold package trays, doors, or covers, and/or other types of retaining elements associated with one or more package trays, doors, or covers. In some example embodiments, the latches 336 may substantially prevent sliding or movement of package trays 333 during driving or navigation of a vehicle. In additional example embodiments, one or more latches 336 may be moved or manipulated together, e.g., as a unit or group via one or more connecting bars, rods, or other elements, to selectively block or allow movement of multiple package trays, doors, or covers simultaneously. Further, the latches 336 may be manually operated, or operated via one or more actuators, such as servos, solenoids, motors, or other types of actuators.

In order to facilitate movement of the package rack 230, one or more rollers, wheels, casters, or other movement elements 337 may be coupled to or associated with a base of the package rack 230. For example, one or more caster wheels may be coupled to the base to allow rolling movement of the package rack 230. In addition, one or more ball rollers may be coupled to the base to allow rolling movement of the package rack 230. In other example embodiments, various pads, feet, skids, or other sliding elements may be coupled to the base to allow sliding movement of the package rack 230.

As shown in FIG. 3, the package rack 230 may also include an identifier 338 and one or more payload pins 339 associated with an upper surface. The identifier 338 may comprise a quick response (QR) code, barcode, numbers, symbols, characters, or any other type of identifier that uniquely identifies the package rack 230 relative to other package racks. In addition, identifiers may be associated with package trays 333 and packages 334 loaded into the package rack 230, and may also be stored in association with the identifier 338 of the package rack. Further, a carrier robot that couples to and moves the package rack 230 may scan the identifier 338 to identify the package rack, as well as package trays and packages loaded therein, in order to facilitate loading, sortation, shuffling, delivery, and unloading processes related to the package rack, as further described herein.

The one or more payload pins 339 may comprise pins, rods, poles, knobs, hooks, or other structures by which a carrier robot may engage the package rack 230. As further described herein, a carrier robot may have one or more corresponding structures to engage the one or more payload pins 339. Upon engagement, the carrier robot may move the package rack 230 by transfer of forces via the payload pins 339, such that the package rack 230 rolls, slides, or moves within the cargo area of the vehicle in response to movement or maneuvering of the carrier robot along the track or rail system. In example embodiments, the payload pins 339 may be substantially rigid in order to transfer forces resulting from movement of the carrier robot to a remainder of the package rack, such that the carrier robot and the engaged package rack move substantially as a unit.

Although FIG. 3 illustrates a particular size, shape, configuration, or arrangement of an example package rack, other example embodiments may include other sizes, shapes, configurations, or arrangements. For example, the package rack may have other sizes or shapes, the package rack may receive different numbers or arrangements of package trays and packages, the package rack may include other types of retaining elements to prevent falling out of package trays or packages, the package rack may have other numbers, types, or combinations of rolling, sliding, or movement elements, the package rack may have other numbers, types, or arrangements of one or more payload pins, and/or various other modifications may be made to portions of the package rack.

Figure 4:
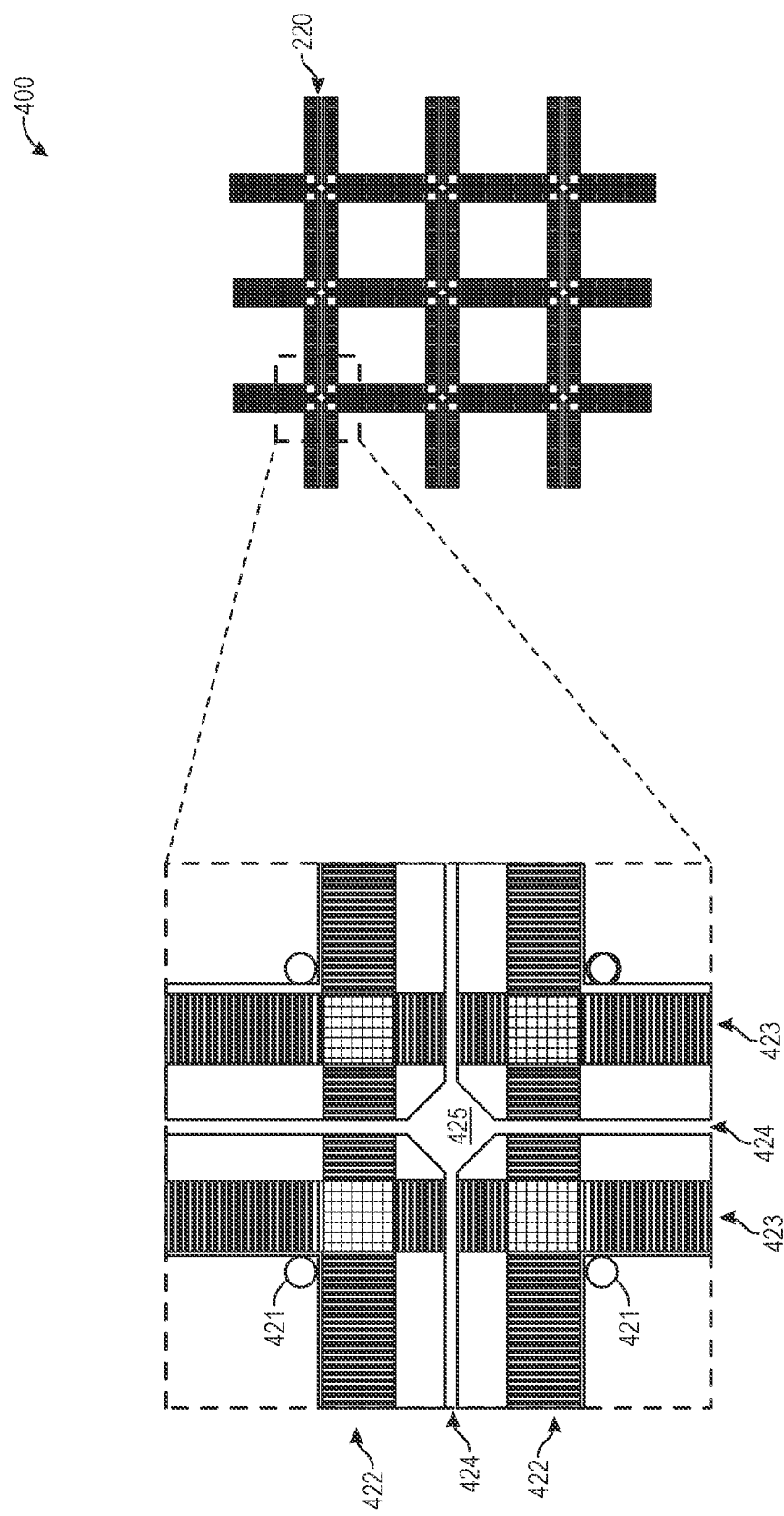
FIG. 4 illustrates schematic top view diagrams of an example rail system of an automated mobile sortation and delivery system, in accordance with implementations of the present disclosure.

FIG. 4 illustrates schematic top view diagrams 400 of an example rail system of an automated mobile sortation and delivery system, in accordance with implementations of the present disclosure.

As shown at the right side of FIG. 4, an example track or rail system 220 may include a plurality of positions, e.g., nine positions arranged in a three-by-three grid. Other example embodiments may include other numbers, configurations, or arrangements of a plurality of positions associated with the track or rail system 220.

In addition, each of the plurality of positions may have an associated identifier, such as a quick response (QR) code, barcode, numbers, symbols, characters, or any other type of identifier that uniquely identifies each of the plurality of positions. For example, the identifiers may be located on portions of the track or rail system 220, on a roof of the cargo area, and/or any other location proximate respective positions. Further, a carrier robot that couples to and moves a package rack may scan the identifier to identify the position, in order to facilitate loading, sortation, shuffling, delivery, and unloading processes related to the package rack, as further described herein.

Although not shown in FIG. 4, the track or rail system 220 may also extend to a loading or unloading position toward a rear of the cargo area of the vehicle. This may enable carrier robots to move to the loading or unloading position to receive and engage a package rack, e.g., to facilitate loading into the cargo area, and/or to release and disengage a package rack, e.g., to facilitate unloading from the cargo area. In some additional example embodiments, package racks may be moved or transferred between loading or unloading positions of adjacent vehicles, e.g., upon positioning or aligning respective cargo areas and respective loading or unloading positions adjacent each other.

As shown in the expanded view at the left side of FIG. 4, the example track or rail system 220 may comprise one or more supports 421, a first set of tracks 422, a second set of tracks 423, a plurality of slots 424, and a plurality of intersections 425 associated with the plurality of slots 424.

In example embodiments, the one or more supports 421 may comprise beams, rods, poles, columns, or other structures that couple the track or rail system 220 to a roof and/or walls within the cargo area of a vehicle. In this manner, the track or rail system 220 may be positioned overhead or proximate a roof of a cargo area, and/or the track or rail system 220 may be rigidly suspended within the cargo area. By positioning the track or rail system 220 overhead within the cargo area, the floor or base of the cargo area may remain substantially free of any structures, fixtures, or other obstructions, such that the cargo area may still be used for conventional loading, delivery, or unloading processes in scenarios in which the automated mobile sortation and delivery system is not being utilized.

The first set of tracks 422 may extend substantially in a first direction, e.g., left and right as shown in FIG. 4. The first set of tracks 422 may be utilized by carrier robots to travel or maneuver along the first direction, e.g., to move an engaged package rack between positions within the cargo area. Likewise, the second set of tracks 423 may extend substantially in a second direction, e.g., up and down as shown in FIG. 4. The second set of tracks 423 may be utilized by carrier robots to travel or maneuver along the second direction, e.g., to move an engaged package rack between positions within the cargo area. The first and second set of tracks 422, 423 may also comprise grooves, treads, knurling, or other surface features to facilitate traction and movement of carrier robots along the tracks.

The plurality of slots 424 may enable continuous connection, coupling, or engagement between carrier robots and associated package racks via corresponding payload sleeves and payload pins. As further described herein, a carrier robot may travel or maneuver substantially above or on top of the track or rail system 220, and an engaged package rack may roll, slide, or move substantially below the track or rail system 220. For example, during movement of the package rack by the carrier robot via the first or second set of tracks 422, 423, the carrier robot may remain coupled or engaged to the package rack via one or more payload sleeves and payload pins. At least a portion of the payload sleeves and/or payload pins may extend between the carrier robot and package rack and/or remain situated within portions of the plurality of slots 424 during various movements of the carrier robot along the first or second set of tracks 422, 423.

The plurality of intersections 425 associated with the slots 424 may also enable continuous connection, coupling, or engagement between carrier robots and associated package racks via corresponding payload sleeves and payload pins. For example, the intersections 425 may have a determined or selected shape, e.g., a square, diamond, or other shapes, and may act as self-centering openings to accommodate and correct movement inaccuracies by the carrier robots, such as when transitioning between movement along a first direction and movement along a second direction. Further, a portion of a carrier robot, e.g., an underside thereof, may have a corresponding protrusion, shape, or feature that fits within the shape of the intersections 425, as further described herein. Thus, the intersections 425 may also operate as locking features to secure a carrier robot and engaged package rack at a desired position of the plurality of positions. The locking features may provide greater support and positive positioning of carrier robots and engaged package racks even in the presence of external forces, such as accelerations, turns, inclines or grades, bumps, or other forces or accelerations as a result of driving or movement of the vehicle.

Although FIG. 4 illustrates a particular size, shape, configuration, or arrangement of an example track or rail system, other example embodiments may include other sizes, shapes, configurations, or arrangements. For example, the track or rail system may have other sizes or shapes, the track or rail system may include different numbers or arrangements of a plurality of positions, the track or rail system may include other types, numbers, configurations, or arrangements of one or more sets of tracks, the track or rail system may include other sizes, shapes, or arrangements of slots, the track or rail system may include other sizes, shapes, or configurations of intersections associated with slots, and/or various other modifications may be made to portions of the track or rail system.

Figure 5A:
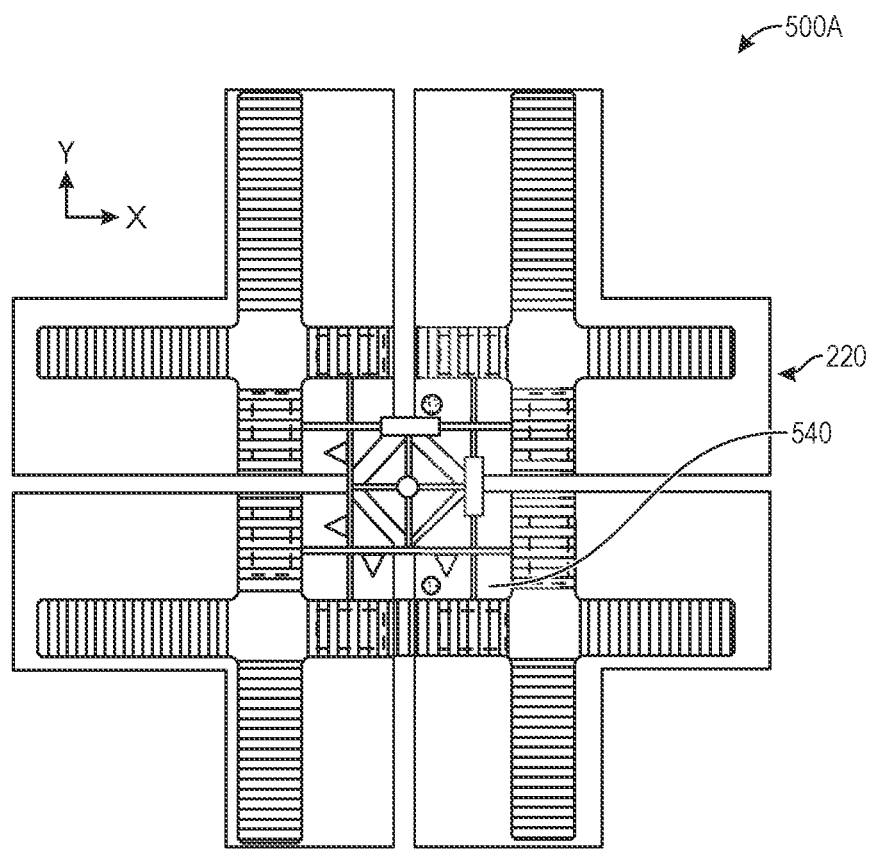
FIG. 5A illustrates a schematic top view diagram of an example carrier robot and rail system of an automated mobile sortation and delivery system, in accordance with implementations of the present disclosure.

FIG. 5A illustrates a schematic top view diagram 500A of an example carrier robot and rail system of an automated mobile sortation and delivery system, in accordance with implementations of the present disclosure.

As shown in FIG. 5A, an example carrier robot 540 may be positioned on the track or rail system 220. For example, the carrier robot 540 may be positioned at a current position of the plurality of positions of the track system 220. From the current position, the carrier robot 540 may move along a first direction, e.g., along an X direction, via a first set of tracks, or the carrier robot 540 may move along a second direction, e.g., along a Y direction, via a second set of tracks. In addition, the carrier robot 540 may be coupled or engaged with a package rack, e.g., via a payload sleeve on an underside of the carrier robot 540, and the carrier robot 540 may move the package rack among the plurality of positions responsive to movement along the track system 220.

Figure 5B:
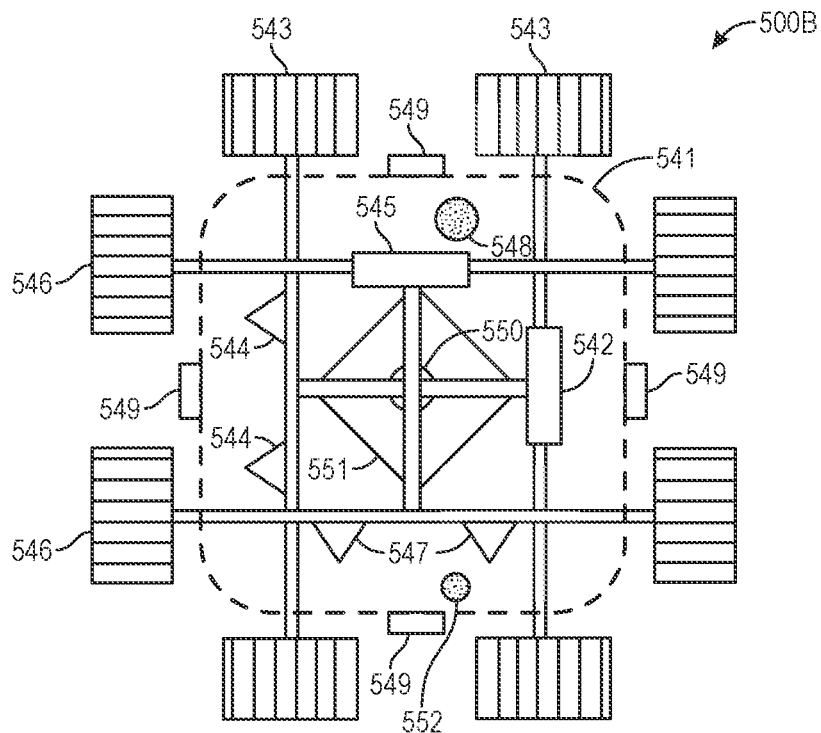
FIG. 5B illustrates a schematic top view diagram of an example carrier robot of an automated mobile sortation and delivery system, in accordance with implementations of the present disclosure.

FIG. 5B illustrates a schematic top view diagram 500B of an example carrier robot of an automated mobile sortation and delivery system, in accordance with implementations of the present disclosure.

As shown in FIG. 5B, an example carrier robot 540 may comprise a structure or body, computing devices or processors, memory, controllers, batteries or power supplies, drivetrain or drive mechanisms, sensors, and/or other components. For example, the carrier robot 540 may comprise a body 541, a first drive motor or actuator 542 and first drive wheels 543, a first drive engagement mechanism 544, a second drive motor or actuator 545 and second drive wheels 546, a second drive engagement mechanism 547, one or more imaging or scanning sensors 548, one or more distance, proximity, ranging, or time-of-flight sensors 549, a payload sleeve 550, a locking protrusion 551, and an electrical charging contact 552.

The body 541 may comprise an enclosure, platform, frame, housing, or other structure that may receive, house, or encompass various components of the carrier robot 540. For example, the body 541 may comprise a substantially rectangular prism shape with a base or lower surface, one or more sidewalls, and a top or upper surface. Various components may be positioned or received within or inside the body 541, some components may be positioned or coupled to an exterior surface of the body 541, and/or other components may be positioned within and extend through portions of the body 541 to an exterior of the body.

The first drive motor or actuator 542 may comprise a rotary motor, brushless motor, or other types of motors or actuators, and the first drive wheels 543 may comprise rollers, treads, gears, or other types of wheels that are operationally coupled to the first drive motor or actuator 542 via a first drivetrain, e.g., shafts, axles, gearboxes, and/or other drive transfer components. The first drive motor 542 may cause rotation of the first drive wheels 543 in a first rotational direction to cause movement or travel of the carrier robot in a positive first direction, e.g., a positive X direction, and may also cause rotation of the first drive wheels 543 in an opposite rotational direction to cause movement or travel of the carrier robot in a negative first direction that is opposite the positive first direction, e.g., a negative X direction.

The first drive engagement mechanism 544 may comprise a stepper motor, linear motor, servo, solenoid, or other types of motors or actuators to move the first drive wheels 543, and/or portions of the associated first drivetrain, between a first raised position and a first lowered position. In the first raised position, the first drive wheels 543 may be moved up, lifted, or raised away from the track system 220, such that the first drive wheels 543 do not contact and may not cause movement of the carrier robot 540 along the first direction. In the first lowered position, the first drive wheels 543 may be moved down or lowered toward the track system 220, such that the first drive wheels 543 contact and may cause movement of the carrier robot 540 along the first direction.

The second drive motor or actuator 545 may comprise a rotary motor, brushless motor, or other types of motors or actuators, and the second drive wheels 546 may comprise rollers, treads, gears, or other types of wheels that are operationally coupled to the second drive motor or actuator 545 via a second drivetrain, e.g., shafts, axles, gearboxes, and/or other drive transfer components. The second drive motor 545 may cause rotation of the second drive wheels 546 in a second rotational direction to cause movement or travel of the carrier robot in a positive second direction, e.g., a positive Y direction, and may also cause rotation of the second drive wheels 546 in an opposite rotational direction to cause movement or travel of the carrier robot in a negative second direction that is opposite the positive second direction, e.g., a negative Y direction.

The second drive engagement mechanism 547 may comprise a stepper motor, linear motor, servo, solenoid, or other types of motors or actuators to move the second drive wheels 546, and/or portions of the associated second drivetrain, between a second raised position and a second lowered position. In the second raised position, the second drive wheels 546 may be moved up, lifted, or raised away from the track system 220, such that the second drive wheels 546 do not contact and may not cause movement of the carrier robot 540 along the second direction. In the second lowered position, the second drive wheels 546 may be moved down or lowered toward the track system 220, such that the second drive wheels 546 contact and may cause movement of the carrier robot 540 along the second direction.

The one or more sensors 548 may comprise imaging sensors, scanning devices, or other types of imaging sensors or devices. For example, a first imaging or scanning sensor 548 may be positioned on the body 541, e.g., along a top or upper surface of the body 541, and oriented to have a field of view that points upward toward a roof of a cargo area of a vehicle. Alternatively, the first imaging or scanning sensor 548 may be positioned on the body 541, e.g., along a base or lower surface of the body 541, and oriented to have a field of view that points downward toward a portion of the track system 220. The first imaging or scanning sensor 548 may detect identifiers associated with individual positions of the plurality of positions of the automated mobile sortation and delivery system, e.g., to detect and determine a current position of the carrier robot 540.

In addition, a second imaging or scanning sensor 548 may be positioned on the body 541, e.g., along a base or lower surface of the body 541, and oriented to have a field of view that points downward toward upper surfaces of package racks that may be engaged by the carrier robot. The second imaging or scanning sensor 548 may detect identifiers associated with package racks, e.g., to detect and determine a package rack, and associated package trays and packages, engaged by the carrier robot 540.

The one or more distance, proximity, ranging, or time-of-flight sensors 549 may comprise depth sensors, distance sensors, proximity sensors, ranging or time-of-flight sensors such as radar sensors or light detection and ranging (LIDAR) sensors, or other types of sensors. For example, four distance or ranging sensors 549 may be positioned around a periphery of the body 541, with each distance or ranging sensor 549 oriented or pointed to detect distance, range, or proximity in a different direction. In an example embodiment, a first distance or ranging sensor 549 may detect distance, range, or proximity in a positive X direction, a second distance or ranging sensor 549 may detect distance, range, or proximity in a negative X direction, a third distance or ranging sensor 549 may detect distance, range, or proximity in a positive Y direction, and a fourth distance or ranging sensor 549 may detect distance, range, or proximity in a negative Y direction.

The distance or ranging sensors 549 may detect presence of adjacent carrier robots or other obstacles in one or more directions, in order to prevent contact or collision by or between carrier robots. In addition, the distance or ranging sensors 549 may detect presence of adjacent carrier robots in one or more directions, in order to determine current and relative positions of the carrier robots, which may be used together with or in place of the identifiers and imaging or scanning sensors 548 to determine positions of the carrier robots. Further, the distance or ranging sensors 549 may also comprise imaging or scanning sensors that may be used to identify adjacent carrier robots in one or more directions, e.g., by detecting one or more identifiers associated with carrier robots, which may be similar to other identifiers described herein.

The payload sleeve 550 may comprise a pipe, tube, enclosure, latch, or other structure that is configured to receive, engage, release, and disengage a payload pin associated with an upper surface of a package rack. In an example embodiment, the payload sleeve 550 may open and close in a clamshell-like manner to receive, engage, release, and disengage a payload pin. In another example embodiment, the payload sleeve 550 may move, extend, and/or retract in a vertical direction to surround, clamp, or otherwise engage a payload pin. For example, the payload sleeve 550 may receive and engage the payload pin, in order to couple a carrier robot with a package rack. In addition, during movement of the carrier robot along the track system, the payload sleeve 550 may maintain engagement with the payload pin, such that the package rack moves in response to movement of the carrier robot. Further, the payload sleeve 550 may disengage and release the payload pin, in order to decouple a carrier robot from a package rack.

In some example embodiments, the payload sleeve 550 of the carrier robot and/or the payload pin of a package rack may have a damper mechanism or element, e.g., a fluid or viscous damper, a spring, a shock absorber, or other types of damper mechanisms. For example, the damper mechanism may permit relative vertical movement between the payload sleeve 550 and an engaged payload pin, in order to absorb or accommodate vertical movement of a package rack relative to a carrier robot, e.g., in response to forces, accelerations, bumps, or other forces during driving of a vehicle. In addition, at an upper end or limit of relative vertical movement between the payload sleeve 550 and an engaged payload pin, the payload sleeve 550 may be configured to contact and transfer forces or accelerations substantially to portions of the track system rather than to portions of a carrier robot, e.g., drive mechanisms of a carrier robot, in order to avoid excessive forces or loads and potential damage to the carrier robot.

The locking protrusion 551 may comprise a protrusion, element, or other surface feature associated with a base or lower surface of the body 541 that is sized and shaped to fit within apertures at intersections of slots, and/or at other portions of slots, of the track system. In an example embodiment, the locking protrusion 551 may have a square or diamond shape that is sized to fit within apertures at intersections of slots of the track system that also have a square or diamond shape. In addition, portions of the locking protrusion 551 may be tapered or angled to facilitate centering and insertion of the locking protrusion 551 within a corresponding aperture.

In order to engage the locking protrusion 551 with a corresponding aperture at an intersection, the first and second drive engagement mechanisms 544, 547 may raise the first and second drive wheels 543, 546 to respective raised positions away from the track system. In this manner, a base or lower surface of the body 541 may be lowered toward the track system, and the locking protrusion 551 may be inserted into and engaged with an aperture at an intersection of the plurality of slots of the track system. Similarly, in order to disengage the locking protrusion 551 from a corresponding aperture at an intersection, one or both of the first and second drive engagement mechanisms 544, 547 may lower respective first and/or second drive wheels 543, 546 to respective lowered positions toward the track system. In this manner, a base or lower surface of the body 541 may be lifted or raised away from the track system, and the locking protrusion 551 may be withdrawn from and disengaged from an aperture at an intersection of the plurality of slots of the track system.

The electrical charging contact 552 may comprise an electrical interface, port, contact element, or an inductive element that may provide electrical current or voltage to charge or otherwise provide power to a battery or other power supplies associated with the carrier robot 540, e.g., from one or more power sources onboard the vehicle. In some example embodiments, the body 541 may be lowered to contact and engage the electrical charging contact 552 to provide current to a battery or power supply of the carrier robot 540. In other example embodiments, the body 541 may remain at a defined distance from the electrical charging contact 552, and the electrical charging contact 552 may still provide current to a battery or power supply of the carrier robot 540, e.g., via inductive charging or other non-contact charging methods.

Although FIGS. 5A and 5B illustrate a particular size, shape, configuration, or arrangement of an example carrier robot, other example embodiments may include other sizes, shapes, configurations, or arrangements. For example, the carrier robot may have other sizes or shapes, the carrier robot may include different types, numbers, or arrangements of drive mechanisms, drivetrains, and/or drive wheels, the carrier robot may include different types, numbers, orientations, or arrangements of various sensors, the carrier robot may include different types, numbers, or arrangements of payload sleeves, the carrier robot may include different types, numbers, or arrangements of locking protrusions, and/or various other modifications may be made to portions of the carrier robot.

In further example embodiments, the carrier robot may be substantially inverted from the example illustrated in FIGS. 5A and 5B. For example, the carrier robot may be suspended from the track system via one or more movable, rollable, or slidable connections that extend through the plurality of slots, and the drive mechanisms may be positioned under the track system. In addition, the sets of tracks of the track system may be formed or positioned on an underside of the track system. In this manner, the drive mechanisms may be engaged to the track system for movement by raising the drive wheels up toward the overhead track system, and the drive mechanisms may be disengaged from the track system by lowering the drive wheels down and away from the overhead track system. Other example embodiments of carrier robots may include various other modifications, reconfigurations, or combinations of various components and features described herein.

In still further example embodiments, the track system may be positioned on or proximate a floor, or under a floor, of a cargo area of a vehicle, and corresponding changes or modifications may be made to portions of the track system, package racks, and carrier robots. For example, the track system may be coupled or secured to portions of a floor or walls of the cargo area of the vehicle, package racks may include identifiers and payload pins on a lower surface or underside thereof, and/or carrier robots may include payload sleeves on an upper surface thereof. Various additional aspects of the track system, package racks, and/or carrier robots may be reconfigured, rearranged, or modified to facilitate engagement and movement of package racks by carrier robots via a track system positioned on or proximate a floor, or under a floor, of a cargo area of a vehicle.

FIGS. 6A-6D illustrate schematic side view diagrams 600A, 600B, 600C, 600D of example configurations of an example carrier robot, rail system, and package rack of an automated mobile sortation and delivery system, in accordance with implementations of the present disclosure.

As shown in FIGS. 6A-6D, upon engaging or coupling a payload sleeve 550 of a carrier robot 540 with a payload pin 339 of a package rack 230, the package rack 230 may be moved or manipulated within a cargo area of a vehicle responsive to movement of the carrier robot 540 upon the track system 220. In the example embodiment of a cargo area having nine positions in a three-by-three grid for package racks, a total of eight carrier robots and eight package racks may be loaded, sorted, and shuffled within the cargo area to perform various delivery processes. At least one position of the plurality of positions within the cargo area should remain empty in order to facilitate sortation and shuffling of the package racks by carrier robots. Alternatively, two or more positions of the plurality of positions within the cargo area may be maintained empty in order to facilitate faster sortation and shuffling of the package racks by carrier robots, as well as to enable manual movement or shuffling of package racks by an associate, e.g., in response to errors, malfunctions, or other issues or problems with one or more portions of the automated mobile sortation and delivery system.

Other example embodiments may include other numbers or arrangements of a plurality of positions within the cargo area. Furthermore, although the examples herein describe that each package rack 230 is continuously coupled or engaged to a designated carrier robot 540 upon loading into a cargo area, other example embodiments may utilize fewer carrier robots than a number of loaded package racks, and the carrier robots may then disengage and engage various package racks during delivery processes in order to move, sort, or shuffle package racks as desired.

As shown in FIG. 6A, in order to move a package rack 230 along a first direction, e.g., left or right along the page of the figure, the carrier robot 540 may lower a first set of drive wheels 543 to contact a first set of tracks of the track system 220, and the carrier robot 540 may raise a second set of drive wheels 546 to prevent contact with a second set of tracks of the track system 220. In this configuration, the carrier robot 540 may actuate the first set of drive wheels 543 to move along the first direction between a plurality of positions, including a loading or unloading position, storage positions, and/or an access position.

As shown in FIG. 6B, in order to move a package rack 230 along a second direction, e.g., in or out of the page of the figure, the carrier robot 540 may lower the second set of drive wheels 546 to contact the second set of tracks of the track system 220, and the carrier robot 540 may raise the first set of drive wheels 543 to prevent contact with the first set of tracks of the track system 220. In this configuration, the carrier robot 540 may actuate the second set of drive wheels 546 to move along the second direction between a plurality of positions, including a loading or unloading position, storage positions, and/or an access position.

As shown in FIG. 6C, in order to hold or retain a package rack 230 at a current position, the carrier robot 540 may raise the first set of drive wheels 543 to prevent contact with the first set of tracks of the track system 220, and the carrier robot 540 may raise the second set of drive wheels 546 to prevent contact with the second set of tracks of the track system 220. In this configuration, a base or lower surface of the carrier robot 540 may come into contact with the track system 220, and a locking protrusion 551 associated with the base or lower surface of the carrier robot 540 may be inserted into and engage with a corresponding aperture of the track system, e.g., associated with an intersection of the plurality of slots. As a result, the carrier robot 540 and package rack 230 may be substantially locked or held in the current position even in the presence of external forces, accelerations, or loads, which may be desirable during movement or driving of the vehicle.

As shown in FIG. 6D, in order to hold or retain a package rack 230 at a current position in an alternative embodiment, the carrier robot 540 may lower the first set of drive wheels 543 to contact the first set of tracks of the track system 220, and the carrier robot 540 may lower the second set of drive wheels 546 to contact the second set of tracks of the track system 220. In this configuration, because of the angled or orthogonal rotational directions of the first and second sets of drive wheels 543, 546, movement of the carrier robot 540 may be substantially prevented or minimized at generally any position along the track system 220, e.g., even at positions that do not include apertures configured to receive locking protrusions. As a result, the carrier robot 540 and package rack 230 may again be substantially locked or held in the current position even in the presence of external forces, accelerations, or loads, which may be desirable during movement or driving of the vehicle.

Using the various configurations and movements of carrier robots and package racks along track systems of an automated mobile sortation and delivery system described herein, package racks may be loaded by carrier robots into a cargo area of a vehicle, moved, sorted, and shuffled by carrier robots among a plurality of positions within the cargo area, moved by carrier robots to an access position in order to deliver packages within individual package racks, and also unloaded by carrier robots from the cargo area of the vehicle. Further, the package racks may be safely transported within a cargo area of a vehicle by locking or holding package racks at various positions using various locking features and configurations of the carrier robots and track systems.

Figure 7:
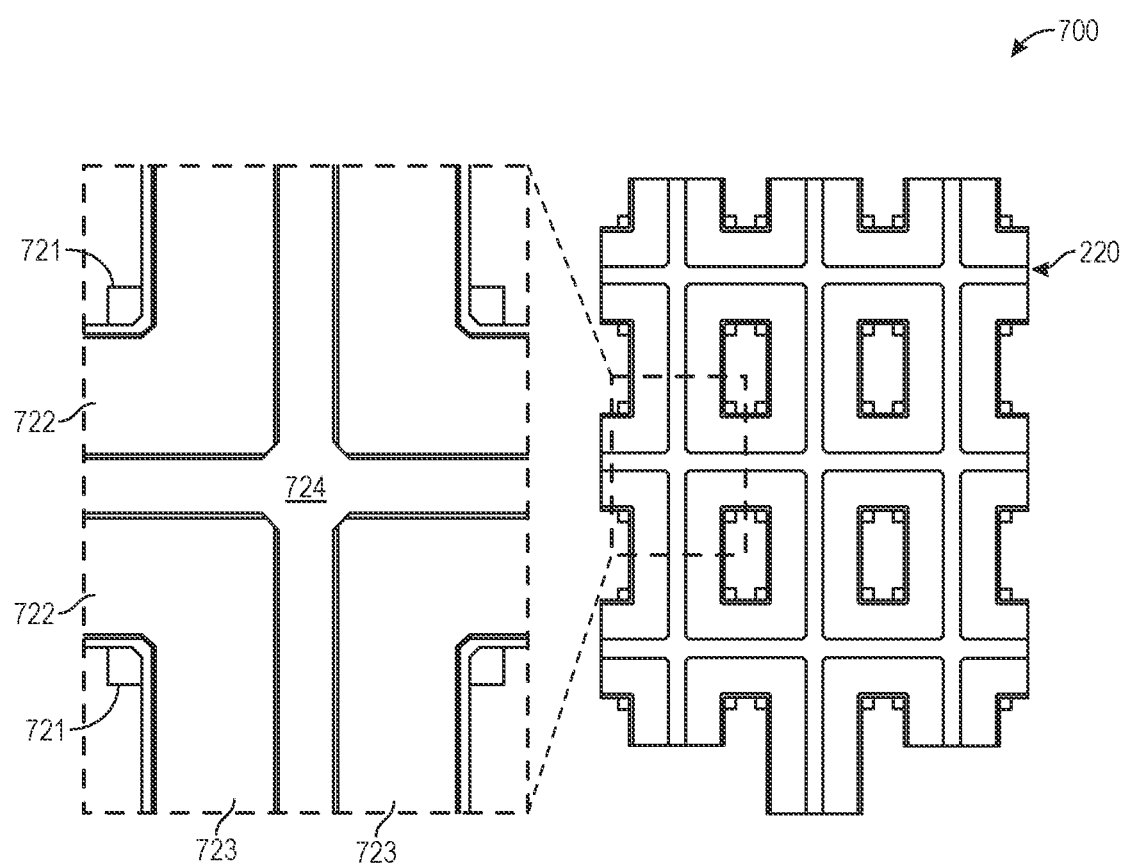
FIG. 7 illustrates schematic top view diagrams of another example rail system of an automated mobile sortation and delivery system, in accordance with implementations of the present disclosure.

FIG. 7 illustrates schematic top view diagrams 700 of another example rail system of an automated mobile sortation and delivery system, in accordance with implementations of the present disclosure. The rail system of FIG. 7 may include any and all of the features of the rail system of FIG. 4.

As shown at the right side of FIG. 7, an example track or rail system 220 may include a plurality of positions, e.g., nine positions arranged in a three-by-three grid. Other example embodiments may include other numbers, configurations, or arrangements of a plurality of positions associated with the track or rail system 220.

In addition, each of the plurality of positions may have an associated identifier, such as a quick response (QR) code, barcode, numbers, symbols, characters, or any other type of identifier that uniquely identifies each of the plurality of positions. For example, the identifiers may be located on portions of the track or rail system 220, on a roof of the cargo area, and/or any other location proximate respective positions. Further, a carrier robot that couples to and moves a package rack may scan the identifier to identify the position, in order to facilitate loading, sortation, shuffling, delivery, and unloading processes related to the package rack, as further described herein.

As partially shown at the bottom at the right side of FIG. 7, the track or rail system 220 may also extend to a loading or unloading position toward a rear of the cargo area of the vehicle. This may enable carrier robots to move to the loading or unloading position to receive and engage a package rack, e.g., to facilitate loading into the cargo area, and/or to release and disengage a package rack, e.g., to facilitate unloading from the cargo area. In some additional example embodiments, package racks may be moved or transferred between loading or unloading positions of adjacent vehicles, e.g., upon positioning or aligning respective cargo areas and respective loading or unloading positions adjacent each other.

As shown in the expanded view at the left side of FIG. 7, the example track or rail system 220 may comprise one or more supports 721, a first set of tracks 722, a second set of tracks 723, and a plurality of slots 724.

In example embodiments, the one or more supports 721 may comprise beams, rods, poles, columns, or other structures that couple the track or rail system 220 to a roof and/or walls within the cargo area of a vehicle. In this manner, the track or rail system 220 may be positioned overhead or proximate a roof of a cargo area, and/or the track or rail system 220 may be rigidly suspended within the cargo area. By positioning the track or rail system 220 overhead within the cargo area, the floor or base of the cargo area may remain substantially free of any structures, fixtures, or other obstructions, such that the cargo area may still be used for conventional loading, delivery, or unloading processes in scenarios in which the automated mobile sortation and delivery system is not being utilized.

The first set of tracks 722 may extend substantially in a first direction, e.g., left and right as shown in FIG. 7. The first set of tracks 722 may be utilized by carrier robots to travel or maneuver along the first direction, e.g., to move an engaged package rack between positions within the cargo area. Likewise, the second set of tracks 723 may extend substantially in a second direction, e.g., up and down as shown in FIG. 7. The second set of tracks 723 may be utilized by carrier robots to travel or maneuver along the second direction, e.g., to move an engaged package rack between positions within the cargo area. The first and second set of tracks 722, 723 may also comprise grooves, treads, knurling, or other surface features to facilitate traction and movement of carrier robots along the tracks.

The plurality of slots 724 may enable continuous connection, coupling, or engagement between carrier robots and associated package racks via corresponding payload sleeves and payload pins. As further described herein, a carrier robot may travel or maneuver substantially coupled or suspended from the track or rail system 220, and a portion of the carrier robot may span or extend between a top or upper surface of the track system and a bottom or lower surface of the track system via the plurality of slots 724. In addition, the carrier robot may roll, slide, or move an engaged package rack below the track or rail system 220. For example, during movement of the package rack by the carrier robot via the first or second set of tracks 722, 723, the carrier robot may remain coupled or engaged to the package rack via one or more payload sleeves and payload pins. At least a portion of the payload sleeves and/or payload pins may extend between the carrier robot and package rack, while a portion of the carrier robot remains situated within portions of the plurality of slots 724, during various movements along the first or second set of tracks 722, 723.

The plurality of slots 724 may connect to each other via a plurality of intersections to enable continuous connection, coupling, or engagement between carrier robots and associated package racks via corresponding payload sleeves and payload pins. For example, the intersections may have a determined or selected shape, e.g., a square, diamond, or other shapes, and may act as self-centering openings to accommodate and correct movement inaccuracies by the carrier robots, such as when transitioning between movement along a first direction and movement along a second direction.

Although FIG. 7 illustrates a particular size, shape, configuration, or arrangement of an example track or rail system, other example embodiments may include other sizes, shapes, configurations, or arrangements. For example, the track or rail system may have other sizes or shapes, the track or rail system may include different numbers or arrangements of a plurality of positions, the track or rail system may include other types, numbers, configurations, or arrangements of one or more sets of tracks, the track or rail system may include other sizes, shapes, or arrangements of slots, and/or various other modifications may be made to portions of the track or rail system.

Figure 8:
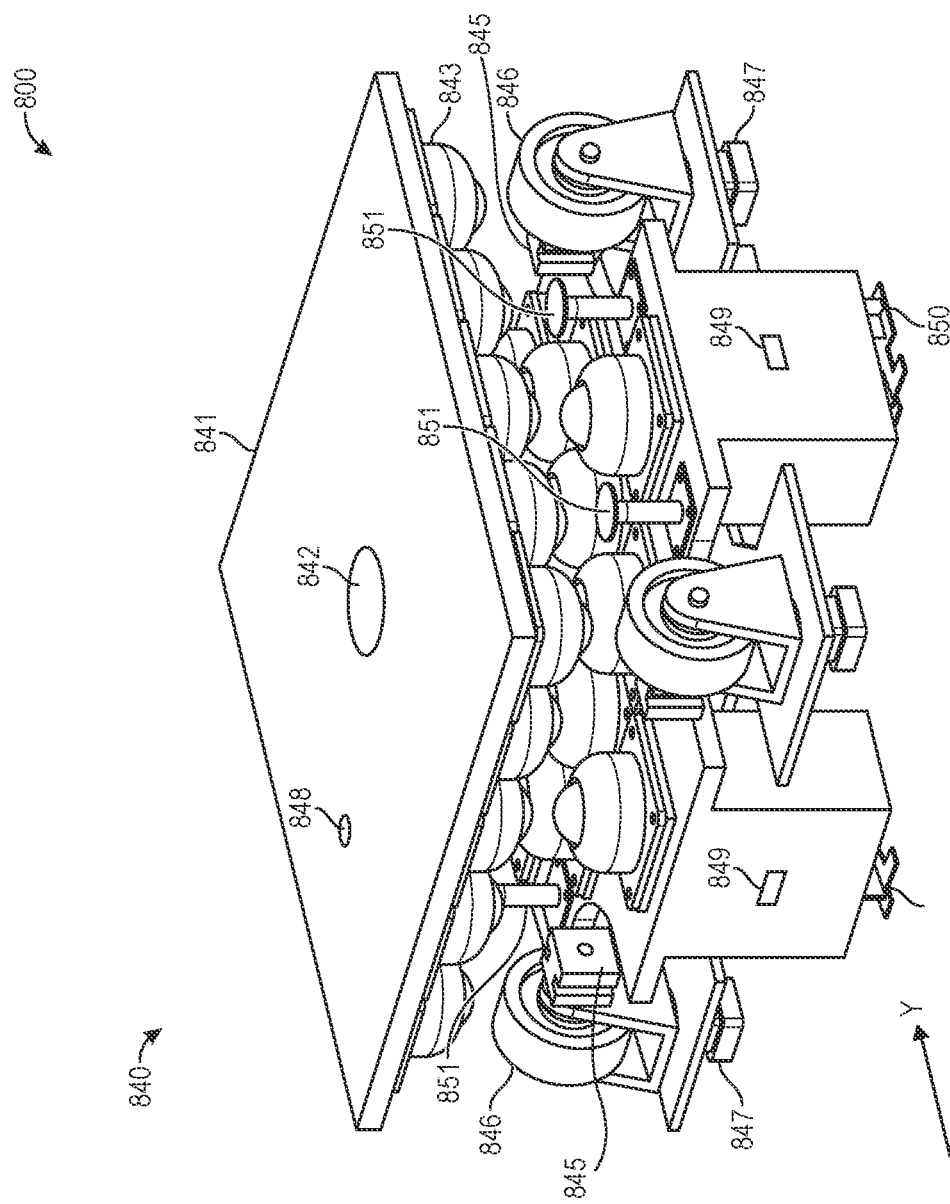
FIG. 8 illustrates a schematic perspective view diagram of another example carrier robot of an automated mobile sortation and delivery system, in accordance with implementations of the present disclosure.

FIG. 8 illustrates a schematic perspective view diagram 800 of another example carrier robot of an automated mobile sortation and delivery system, in accordance with implementations of the present disclosure. The carrier robot of FIG. 8 may include any and all of the features of the carrier robot of FIGS. 5A and 5B.

As shown in FIG. 8, an example carrier robot 840 may be positioned on and move with respect to a track or rail system. For example, the carrier robot 840 may be positioned at a current position of the plurality of positions of the track system. From the current position, the carrier robot 840 may move along a first direction, e.g., along an X direction, via a first set of tracks, or the carrier robot 840 may move along a second direction, e.g., along a Y direction, via a second set of tracks. In addition, the carrier robot 840 may be coupled or engaged with a package rack, e.g., via a payload sleeve on an underside of the carrier robot 840, and the carrier robot 840 may move the package rack among the plurality of positions responsive to movement along the track system.

In example embodiments, an example carrier robot 840 may comprise a structure or body, computing devices or processors, memory, controllers, batteries or power supplies, drivetrain or drive mechanisms, sensors, and/or other components. For example, the carrier robot 840 may comprise a body 841, a body connecting portion 842, a plurality of rollers 843, drive motors or actuators 845 and drive wheels 846, drive engagement mechanisms 847, one or more imaging or scanning sensors 848, one or more distance, proximity, ranging, or time-of-flight sensors 849, one or more payload sleeves 850, and one or more locking elements 851.

The body 841 may comprise an enclosure, platform, frame, housing, or other structure that may receive, house, or encompass various components of the carrier robot 840. For example, the body 841, together with the body connecting portion 842, may comprise a substantially I-shaped frame or structure having a top or upper plate, platform, or housing connected to a base or lower plate, platform, or housing via the body connecting portion 842. The body connecting portion 842 may comprise a beam, rod, pole, column, or other similar structure to couple and connect portions of the body 841. As further described herein, the body connecting portion 842 may span or extend through the plurality of slots 724 of the track system, such that an upper plate or housing of the body 841 is positioned and moves above the track system, and the lower plate or housing of the body 841 is positioned and moves below the track system. Various components may be positioned or received within or inside the body 841, some components may be positioned or coupled to an exterior surface of the body 841, and/or other components may be positioned within and extend through portions of the body 841 to an exterior of the body.

The plurality of rollers 843 may comprise rollers, wheels, ball bearings, other rolling elements, and/or sliding elements that are coupled to portions of the body 841. For example, a first set of rollers 843 may be coupled to an underside of the upper plate or housing of the body 841, and a second set of rollers 843 may be coupled to an upper side of the lower plate or housing of the body 841. In this manner, the first and second sets of rollers 843 may effectively trap or sandwich portions of the track system therebetween, such that the carrier robot 840 may roll, slide, or move while coupled or engaged around portions of the track system, and while the body connecting portion 842 moves within the plurality of slots 724 of the track system. In some example embodiments, the plurality of rollers 843 may include springs, shock absorbers, or other damping elements to absorb forces, accelerations, or other loads that may be transferred to portions of the carrier robot via engaged package racks during travel or movement of a vehicle.

The drive motors or actuators 845 may comprise rotary motors, brushless motors, or other types of motors or actuators, and the drive wheels 846 may comprise rollers, treads, gears, or other types of wheels that are operationally coupled to the drive motors or actuators 845 via respective drivetrains, e.g., shafts, axles, gearboxes, and/or other drive transfer components. The drive motors 845 may cause rotation of the drive wheels 846 in a positive rotational direction to cause movement or travel of the carrier robot in a positive direction, e.g., a positive X or positive Y direction, and may also cause rotation of the drive wheels 846 in an opposite, negative rotational direction to cause movement or travel of the carrier robot in a negative direction that is opposite the positive direction, e.g., a negative X or negative Y direction.

The drive engagement mechanisms 847 may comprise stepper motors, linear motors, servos, solenoids, or other types of motors or actuators to move the drive wheels 846, and/or portions of the drivetrains, between a raised position and a lowered position, as well as to rotate the drive wheels 846 between a first rotational orientation and a second rotational orientation. In the raised position, the drive wheels 846 may be moved up, lifted, or raised toward the track system 220, such that the drive wheels 846 contact and may cause movement of the carrier robot 840 along a first or second direction. In the lowered position, the drive wheels 846 may be moved down or lowered away from the track system 220, such that the drive wheels 846 do not contact and may not cause movement of the carrier robot 840 along the first or second direction.

In addition, in order to alter a direction of travel between a first direction, e.g., along a positive or negative X direction, and a second direction, e.g., along a positive or negative Y direction, the drive engagement mechanisms 847 may rotate the drive wheels 846 between a first rotational position or orientation by which the drive wheels 846 may move the carrier robot along the first direction, and a second rotational position or orientation by which the drive wheels 846 may move the carrier robot along the first direction. Further details of the raised positions, lowered positions, first rotational positions or orientations, and second rotational positions or orientations of the drive wheels 846 responsive to actuation by the drive engagement mechanisms 847 are described herein at least with respect to FIGS. 9A-9D.

The one or more sensors 848 may comprise imaging sensors, scanning devices, or other types of imaging sensors or devices. For example, a first imaging or scanning sensor 848 may be positioned on the body 841, e.g., along an upper plate or housing of the body 841, and oriented to have a field of view that points upward toward a roof of a cargo area of a vehicle. Alternatively, the first imaging or scanning sensor 848 may be positioned on the body 841, e.g., along an upper plate or housing of the body 841, or along a lower plate or housing of the body 841, and oriented to have a field of view that points downward or upward toward a portion of the track system 220. The first imaging or scanning sensor 848 may detect identifiers associated with individual positions of the plurality of positions of the automated mobile sortation and delivery system, e.g., to detect and determine a current position of the carrier robot 840.

In addition, a second imaging or scanning sensor 848 may be positioned on the body 841, e.g., along a lower plate or housing of the body 841, and oriented to have a field of view that points downward toward upper surfaces of package racks that may be engaged by the carrier robot. The second imaging or scanning sensor 848 may detect identifiers associated with package racks, e.g., to detect and determine a package rack, and associated package trays and packages, engaged by the carrier robot 840.

The one or more distance, proximity, ranging, or time-of-flight sensors 849 may comprise depth sensors, distance sensors, proximity sensors, ranging or time-of-flight sensors such as radar sensors or light detection and ranging (LIDAR) sensors, or other types of sensors. For example, four distance or ranging sensors 849 may be positioned around a periphery of the body 841, with each distance or ranging sensor 849 oriented or pointed to detect distance, range, or proximity in a different direction. In an example embodiment, a first distance or ranging sensor 849 may detect distance, range, or proximity in a positive X direction, a second distance or ranging sensor 849 may detect distance, range, or proximity in a negative X direction, a third distance or ranging sensor 849 may detect distance, range, or proximity in a positive Y direction, and a fourth distance or ranging sensor 849 may detect distance, range, or proximity in a negative Y direction.

The distance or ranging sensors 849 may detect presence of adjacent carrier robots or other obstacles in one or more directions, in order to prevent contact or collision by or between carrier robots. In addition, the distance or ranging sensors 849 may detect presence of adjacent carrier robots in one or more directions, in order to determine current and relative positions of the carrier robots, which may be used together with or in place of the identifiers and imaging or scanning sensors 848 to determine positions of the carrier robots. Further, the distance or ranging sensors 849 may also comprise imaging or scanning sensors that may be used to identify adjacent carrier robots in one or more directions, e.g., by detecting one or more identifiers associated with carrier robots, which may be similar to other identifiers described herein.

The payload sleeves 850 may comprise pipes, tubes, enclosures, latches, or other structures that are configured to receive, engage, release, and disengage payload pins associated with an upper surface of a package rack. In an example embodiment, the payload sleeves 850 may open and close in a clamshell-like manner to receive, engage, release, and disengage payload pins. In another example embodiment, the payload sleeves 850 may move, extend, and/or retract in a vertical direction to surround, clamp, or otherwise engage payload pins. In a further example embodiment, the payload sleeves 850 may comprise latches to receive, engage, release, and disengage payload pins. For example, the payload sleeves 850 may receive and engage the payload pins, in order to couple a carrier robot with a package rack. In addition, during movement of the carrier robot along the track system, the payload sleeves 850 may maintain engagement with the payload pins, such that the package rack moves in response to movement of the carrier robot. Further, the payload sleeves 850 may disengage and release the payload pins, in order to decouple a carrier robot from a package rack.

In some example embodiments, the payload sleeves 850 of the carrier robot and/or the payload pins of a package rack may have a damper mechanism or element, e.g., a fluid or viscous damper, a spring, a shock absorber, or other types of damper mechanisms. For example, the damper mechanism may permit relative vertical movement between the payload sleeves 850 and engaged payload pins, in order to absorb or accommodate vertical movement of a package rack relative to a carrier robot, e.g., in response to forces, accelerations, bumps, or other forces during driving of a vehicle. In addition, at an upper end or limit of relative vertical movement between the payload sleeves 850 and engaged payload pins, the payload sleeves 850 may be configured to contact and transfer forces or accelerations substantially to portions of the track system rather than to portions of a carrier robot, e.g., drive mechanisms of a carrier robot, in order to avoid excessive forces or loads and potential damage to the carrier robot.

The locking elements 851 may comprise extendible and retractable pins, rods, beams, protrusions, pads, bumpers, or other structures associated with an upper or lower plate or housing of the body 841 that are sized and shaped to contact, engage, and/or couple with portions of the track system. In an example embodiment, the locking elements 851 may include rods, pads, or bumpers that extend toward and contact portions of the track system to prevent movement of the carrier robot via frictional engagement, and that retract away from and remove contact with portions of the track system to allow movement of the carrier robot. In another example embodiment, portions of the track system may include holes, orifices, or other apertures that are sized or shaped to receive the locking elements 851. Then, the locking elements 851 may include pins, rods, beams, or protrusions that extend toward and are inserted into apertures of the track system to prevent movement of the carrier robot via mechanical or physical interference, and that retract away from and out of apertures of the track system to allow movement of the carrier robot.

Although FIG. 8 illustrates a particular size, shape, configuration, or arrangement of an example carrier robot, other example embodiments may include other sizes, shapes, configurations, or arrangements. For example, the carrier robot may have other sizes or shapes, the carrier robot may include different types, numbers, or arrangements of rollers, drive mechanisms, drivetrains, and/or drive wheels, the carrier robot may include different types, numbers, orientations, or arrangements of various sensors, the carrier robot may include different types, numbers, or arrangements of payload sleeves, the carrier robot may include different types, numbers, or arrangements of locking elements, and/or various other modifications may be made to portions of the carrier robot.

In further example embodiments, the carrier robot may be substantially inverted from the example illustrated in FIG. 8. For example, the carrier robot may be suspended from the track system via one or more rollers, and the drive mechanisms may be positioned above the track system. In addition, the sets of tracks of the track system may be formed or positioned on an upper side of the track system. In this manner, the drive mechanisms may be engaged to the track system for movement by lowering the drive wheels down toward the track system, and the drive mechanisms may be disengaged from the track system by raising the drive wheels up and away from the track system. Other example embodiments of carrier robots may include various other modifications, reconfigurations, or combinations of various components and features described herein.

In still further example embodiments, the track system may be positioned on or proximate a floor, or under a floor, of a cargo area of a vehicle, and corresponding changes or modifications may be made to portions of the track system, package racks, and carrier robots. For example, the track system may be coupled or secured to portions of a floor or walls of the cargo area of the vehicle, package racks may include identifiers and payload pins on a lower surface or underside thereof, and/or carrier robots may include payload sleeves on an upper surface thereof. Various additional aspects of the track system, package racks, and/or carrier robots may be reconfigured, rearranged, or modified to facilitate engagement and movement of package racks by carrier robots via a track system positioned on or proximate a floor, or under a floor, of a cargo area of a vehicle.

FIGS. 9A-9D illustrate schematic side view diagrams 900A, 900B, 900C, 900D of example configurations of another example carrier robot, rail system, and portion of a package rack of an automated mobile sortation and delivery system, in accordance with implementations of the present disclosure.

As shown in FIGS. 9A-9D, upon engaging or coupling payload sleeves 850 of a carrier robot 840 with payload pins 339 of a package rack 230, the package rack 230 may be moved or manipulated within a cargo area of a vehicle responsive to movement of the carrier robot 840 upon the track system 220. In the example embodiment of a cargo area having nine positions in a three-by-three grid for package racks, a total of eight carrier robots and eight package racks may be loaded, sorted, and shuffled within the cargo area to perform various delivery processes. At least one position of the plurality of positions within the cargo area should remain empty in order to facilitate sortation and shuffling of the package racks by carrier robots. Alternatively, two or more positions of the plurality of positions within the cargo area may be maintained empty in order to facilitate faster sortation and shuffling of the package racks by carrier robots, as well as to enable manual movement or shuffling of package racks by an associate, e.g., in response to errors, malfunctions, or other issues or problems with one or more portions of the automated mobile sortation and delivery system.

Other example embodiments may include other numbers or arrangements of a plurality of positions within the cargo area. Furthermore, although the examples herein describe that each package rack 230 is continuously coupled or engaged to a designated carrier robot 840 upon loading into a cargo area, other example embodiments may utilize fewer carrier robots than a number of loaded package racks, and the carrier robots may then disengage and engage various package racks during delivery processes in order to move, sort, or shuffle package racks as desired.

As shown in FIG. 9A, in order to move a package rack 230 along a second direction, e.g., in or out of the page of the figure, the carrier robot 840 may actuate the drive engagement mechanisms 847 to rotate the drive wheels 846 to a second rotational position or orientation and then raise the drive wheels 846 to contact the track system 220. In this configuration, the carrier robot 840 may actuate the drive wheels 846 to move along the second direction, e.g., positive or negative Y direction, between a plurality of positions, including a loading or unloading position, storage positions, and/or an access position.

As shown in FIG. 9B, in order to change a movement direction from the second direction to a first direction, e.g., left or right along the page of the figure, the carrier robot 840 may actuate the drive engagement mechanisms 847 to lower the drive wheels 846 to remove contact with the track system 220. Then, as shown in FIG. 9C, in order to continue to change a movement direction from the second direction to a first direction, e.g., left or right along the page of the figure, the carrier robot 840 may actuate the drive engagement mechanisms 847 to rotate the drive wheels 846 to a first rotational position or orientation from the second rotational position or orientation.

Then, as shown in FIG. 9D, in order to move a package rack 230 along the first direction, e.g., left or right along the page of the figure, the carrier robot 840 may raise the drive wheels 846 in the first rotational position or orientation to contact the track system 220. In this configuration, the carrier robot 840 may actuate the drive wheels 846 to move along the first direction, e.g., positive or negative X direction, between a plurality of positions, including a loading or unloading position, storage positions, and/or an access position.

In some example embodiments, if it is desired to lock the carrier robot 840 at a current position, the locking elements 851 may be extended to contact or engage with portions of the track system and prevent movement of the carrier robot 840, and the drive wheels 846 may be positioned in any of the raised, lowered, first rotational, or second rotational positions or orientations. Generally, it may be preferred to actuate the drive wheels 846 to the lowered position and remove contact with the track system 220 when the carrier robot 840 is not moving and/or when the locking elements 851 are extended or engaged, such that any forces, accelerations, or other loads experienced by an engaged package rack due to vehicle movement may be transferred via structural portions and the plurality of rollers of the carrier robot substantially to the track system, as opposed to transferring such forces, accelerations, or other loads to portions of the drive mechanisms of the carrier robot.

In an alternative embodiment, in order to hold or retain a package rack 230 at a current position, the carrier robot 840 may actuate the drive engagement mechanisms 847 to rotate the drive wheels 846 such that at least one drive wheel 846 is in the first rotational position or orientation and at least one drive wheel 846 is in the second rotational position or orientation. Alternatively, one or more drive wheels 846 may be rotated to other rotational positions or orientations in which at least two drive wheels are orthogonal to each other. In this configuration, because of the angled or orthogonal rotational directions of at least two drive wheels 846, movement of the carrier robot 840 may be substantially prevented or minimized at generally any position along the track system 220, e.g., even at positions that are not associated with locking elements or features. As a result, the carrier robot 840 and package rack 230 may again be substantially locked or held in the current position even in the presence of external forces, accelerations, or loads, which may be desirable during movement or driving of the vehicle.

Using the various configurations and movements of carrier robots and package racks along track systems of an automated mobile sortation and delivery system described herein, package racks may be loaded by carrier robots into a cargo area of a vehicle, moved, sorted, and shuffled by carrier robots among a plurality of positions within the cargo area, moved by carrier robots to an access position in order to deliver packages within individual package racks, and also unloaded by carrier robots from the cargo area of the vehicle. Further, the package racks may be safely transported within a cargo area of a vehicle by locking or holding package racks at various positions using various locking features and configurations of the carrier robots and track systems.

Figure 10:
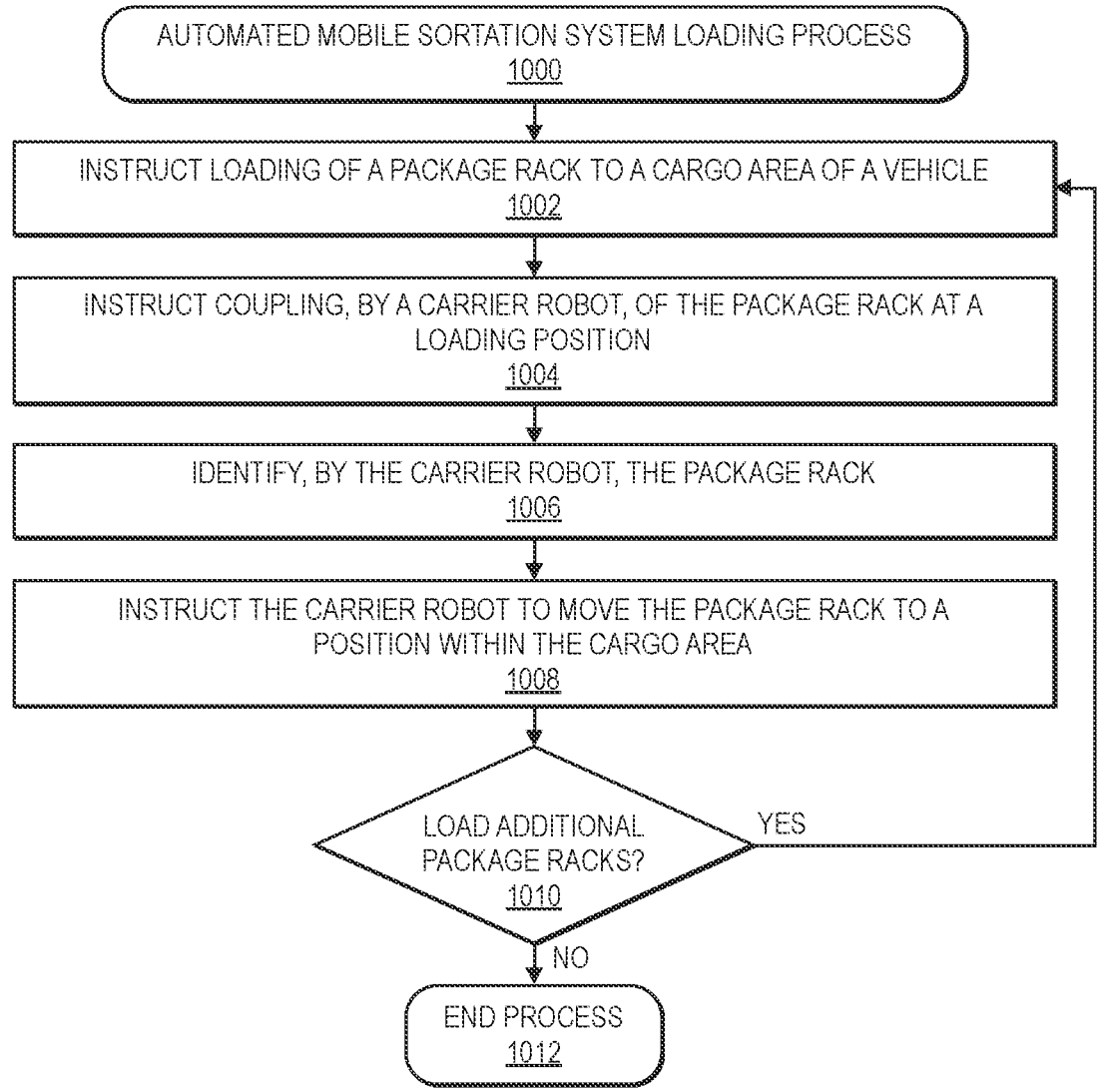
FIG. 10 is a flow diagram illustrating an example automated mobile sortation system loading process, in accordance with implementations of the present disclosure.

FIG. 10 is a flow diagram illustrating an example automated mobile sortation system loading process 1000, in accordance with implementations of the present disclosure.

The process 1000 may begin by instructing loading of a package rack to a cargo area of a vehicle, as at 1002. For example, a package rack may be moved, rolled, slid, lifted, or otherwise manipulated to be loaded into a cargo area of a vehicle, e.g., via a rear access door of the cargo area. One or more lifts, ramps, platforms, or other supporting equipment or structures may be used to load the package rack into the cargo area. In example embodiments, the package rack may be loaded using automated or semi-automated machinery, robots, vehicles, or other equipment, and/or the package rack may be loaded manually by associates. The package rack may be positioned or placed at a loading or unloading position within the cargo area, which may partially overlap an oversize package area toward a rear of the cargo area. In addition, at least a portion of the track system of the automated mobile sortation and delivery system described herein may extend to or be positioned over or proximate the loading or unloading position. Further, a control system may instruct or command loading of a package rack to a cargo area of a vehicle.

The process 1000 may continue by instructing coupling, by a carrier robot, of the package rack at a loading position, as at 1004. For example, a carrier robot may move to the loading or unloading position via the track system and position itself substantially over or on top of the package rack. At the loading or unloading position, one or more payload sleeves of the carrier robot may engage or couple with one or more payload pins of the package rack. As described herein, the payload sleeves may comprise pipes, tubes, latches, hooks, or other connecting elements that may engage, grasp, or hold the payload pins of the package rack. In example embodiments, the payload sleeves may be coupled to the payload pins using actuators associated with the carrier robot, and/or the payload sleeves may be coupled to the payload pins manually by associates. In this manner, the carrier robot may couple to the package rack, in order to be able to move the package rack within the cargo area. Further, a control system may instruct or command coupling of a carrier robot to the package rack.

The process 1000 may proceed by identifying, by the carrier robot, the package rack, as at 1006. For example, one or more imaging, scanning, or other sensors of the carrier robot may detect an identifier associated with the package rack, e.g., a QR code, barcode, or other identifier associated with an upper surface of the package rack. In addition, various package trays and packages received or loaded within the package rack may also be associated with the identifier of the package rack, and the associations may be stored in a datastore or other memory. Further, upon identifying the package rack by the carrier robot, an association between the carrier robot and the package rack may also be stored in memory. In this manner, packages received or loaded within the package rack may be moved, sorted, or shuffled within the cargo area as desired. Further, a control system may instruct or command identification of the package rack by the carrier robot.

The process 1000 may continue to instruct the carrier robot to move the package rack to a position within the cargo area, as at 1008. For example, the carrier robot may move along the track system and thereby move the engaged package rack to a particular or desired position within the cargo area. In example embodiments, based on packages received or loaded within the package rack and based on a planned or scheduled delivery route of the vehicle, the package rack may be positioned at a desired position in order to facilitate fast and efficient delivery of packages along the delivery route, with reduced or minimal movement of the carrier robots and engaged package racks within the cargo area. Further details of movement of package racks by carrier robots are described herein at least with respect to FIG. 13. As described herein, at least one position of a plurality of positions within the cargo area may comprise an access position via which an associate, e.g., a delivery driver or delivery associate, may retrieve packages from package racks through an access door proximate a cabin of the vehicle. Thus, the package racks may be substantially sequentially moved and positioned at the access position to facilitate delivery of packages along the delivery route. Further, a control system may instruct or command movement of the package rack by a carrier robot to a position within the cargo area.

The process 1000 may proceed to determine whether to load additional package racks, as at 1010. For example, a plurality of package racks may be loaded into a cargo area of a vehicle to facilitate delivery of packages along a delivery route. In example embodiments, a cargo area may include nine positions arranged in a three-by-three grid, and eight positions may be loaded with package racks to maximize loading or storage density within the cargo area while also allowing sorting or shuffling of package racks relative to each other. Other example embodiments may include other numbers, configurations, or arrangements of loaded package racks. Further, a control system may determine whether to load additional package racks.

If it is determined that additional package racks are to be loaded, the process 1000 may return to step 1002 to instruct loading of an additional package rack. If, however, it is determined that no additional package racks are to be loaded, the process 1000 may then end, as at 1012.

Figure 11:
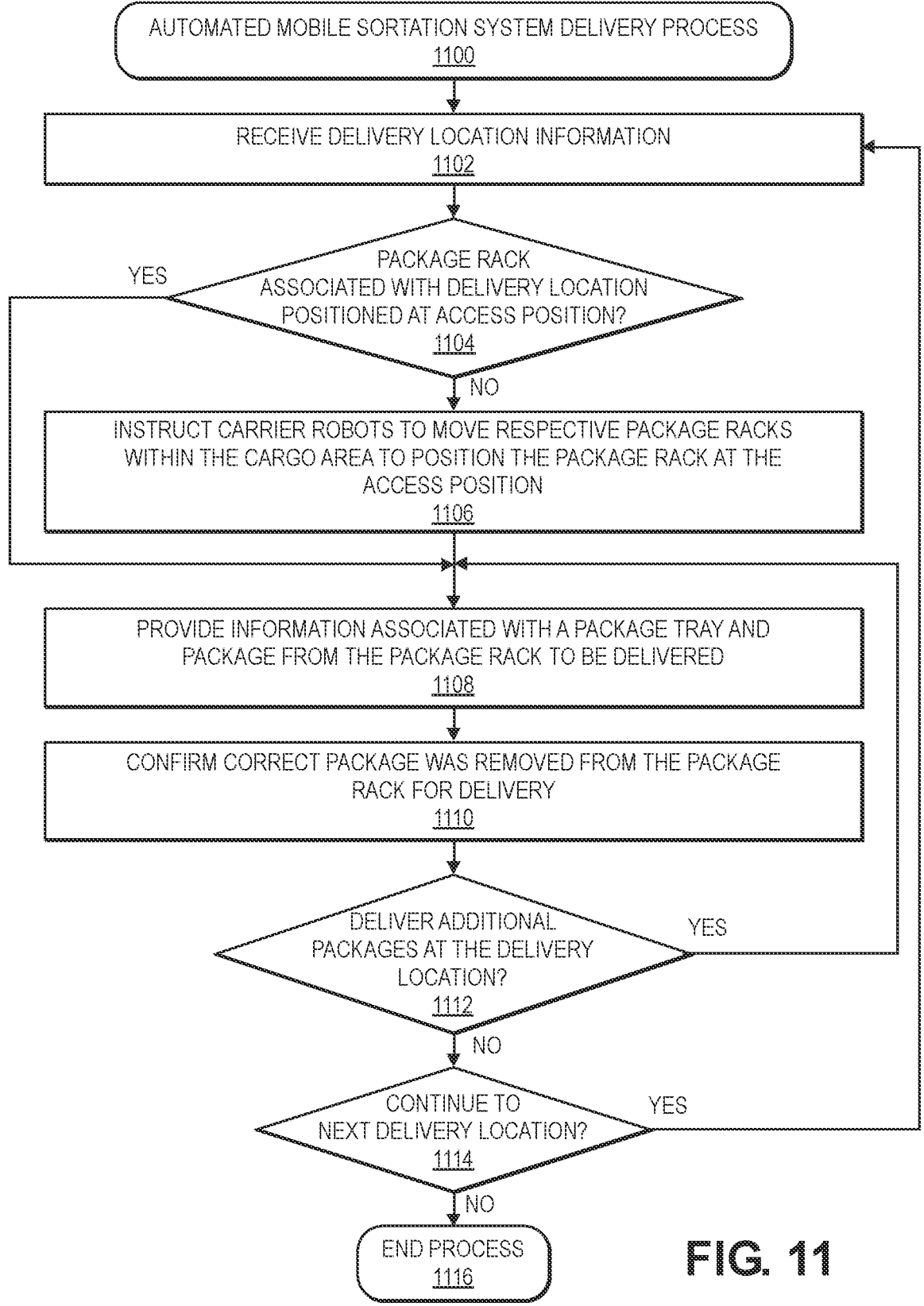
FIG. 11 is a flow diagram illustrating an example automated mobile sortation system delivery process, in accordance with implementations of the present disclosure.

FIG. 11 is a flow diagram illustrating an example automated mobile sortation system delivery process 1100, in accordance with implementations of the present disclosure.

The process 1100 may begin by receiving delivery location information, as at 1102. For example, during travel of a vehicle along a delivery route, delivery location information may be received, e.g., from a navigation system, global positioning system (GPS) sensors, or other types of location sensors associated with the vehicle and/or a control system. The delivery location information may comprise customer delivery locations, routing or delivery waypoints, sortation or distribution destinations, or other types of delivery destinations. In addition, based on stored associations between packages, package racks, and delivery destinations, various packages to be delivered at current or planned locations of a delivery route may be determined. Further, a control system may receive delivery location information.

The process 1100 may continue by determining whether a package rack associated with a delivery location is positioned at an access position, as at 1104. For example, based on stored associations between packages, package racks, and delivery destinations, as well as stored associations between package racks, carrier robots, and current positions associated with the track system, it may be determined whether a package rack having packages to be delivered at the current delivery location is positioned at the access position within the cargo area. As described herein, packages loaded within a package rack may be accessible for retrieval by an associate from the access position within the cargo area and proximate the cabin of the vehicle. Further, a control system may determine whether a package rack associated with a delivery location is positioned at the access position.

If it is determined that a package rack associated with the delivery location is not positioned at the access position, the process 1100 may proceed by instructing carrier robots to move respective package racks within the cargo area to position the package rack at the access position, as at 1106. For example, one or more carrier robots may move, sort, or shuffle engaged package racks among the plurality of positions within the cargo area, in order to position the package rack associated with the delivery location at the access position, thereby facilitating retrieval and delivery of packages from the package rack. In some example embodiments, the package racks may be moved or shuffled in a predetermined pattern or sequence within the cargo area. In other example embodiments, the package racks may be moved or shuffled in any manner or sequence, which may include a minimal number of movements to position the package rack at the access position. Further details of movement of package racks by carrier robots are described herein at least with respect to FIG. 13. Further, a control system may instruct or command movement of package racks by carrier robots to position a package rack at the access position.

If, however, it is determined that a package rack associated with the delivery location is positioned at the access position, or upon moving the package rack to the access position, the process 1100 may continue to provide information associated with a package tray and a package from the package rack to be delivered, as at 1108. For example, a visual input/output device associated with the vehicle and/or the associate may indicate information about a package tray and one or more packages loaded thereon to be retrieved and delivered by an associate. The information may comprise text, identifiers, symbols, images, graphics, or other types of information. In some example embodiments, the visual input/output device may display or present an image or graphic of the package tray, e.g., an overhead view or a view from the perspective of an associate, and may also display or present an indication of the particular package on the package tray, e.g., via a circle, arrow, highlighting, flashing, or other visual indication. Further, a control system may instruct or command display or presentation of information associated with the package tray and package to be delivered.

The process 1100 may proceed to confirm that a correct package was removed from the package rack for delivery, as a 1110. For example, an imaging, scanning, or other sensor may capture data associated with a retrieved package to determine whether the correct package was removed by an associate. The captured data may comprise an identifier, such as a QR code, barcode, or other type of identifier that is associated with the package and the delivery location. Upon confirming that the correct package was retrieved by the associate, the package may be delivered to the delivery location by the associate. In additional example embodiments, the package to be delivered may be an item or object, e.g., an item in its original packaging or an otherwise unpackaged item or object, and the associate may place the item in a package, e.g., a paper bag, envelope, or other lightweight or environmentally-friendly packaging, as part of delivering the item to the delivery location. Further, a control system may instruct or command confirmation of retrieval of a correct package for delivery at a delivery location.

The process 1100 may continue with determining whether to deliver additional packages at the delivery location, as at 1112. For example, based on the delivery route or schedule, one or more packages may be associated with delivery at a particular delivery location. Thus, it may be determined whether all packages associated with a delivery location have been retrieved from a package rack and delivered by an associate. Further, a control system may determine whether additional packages are to be delivered at the delivery location.

If it is determined that additional packages are to be delivered at the delivery location, the process 1100 may return to step 1108 and provide additional information associated with a package tray and additional package to be retrieved for delivery. In some example embodiments, additional packages to be delivered at the delivery location may be stored or positioned within different or additional package racks. In such examples, the process 1100 may return to step 1102 and/or 1104 to determine the additional package rack associated with the delivery location, and to instruct movement of the additional package rack to the access position by a carrier robot.

If, however, it is determined that no additional packages are to be delivered at the delivery location, the process 1100 may proceed with determining whether to continue to a next delivery location, as at 1114. For example, a delivery route or schedule may comprise a plurality of delivery locations. Upon completion of delivery of one or more packages at a current delivery location, the associate or driver of the vehicle may be instructed to travel or move to a next delivery location. Further, a control system may determine whether to continue delivery of packages at a next delivery location.

If it is determined to continue to a next delivery location, the process 1100 may return to step 1102 to receive delivery location information associated with the next delivery location, and the process 1100 may repeat as described herein. If, however, it is determined not to continue to a next delivery location, the process 1100 may then end, as at 1116. In example embodiments, the associate or driver of the vehicle may have completed the delivery route or schedule, such that no next delivery location is available. Alternatively, an associate may have completed a shift or planned work assignment, such that the associate and vehicle should not continue to a next delivery location. Further, an associate and/or vehicle may not continue to a next delivery location for various other reasons.

Figure 12:
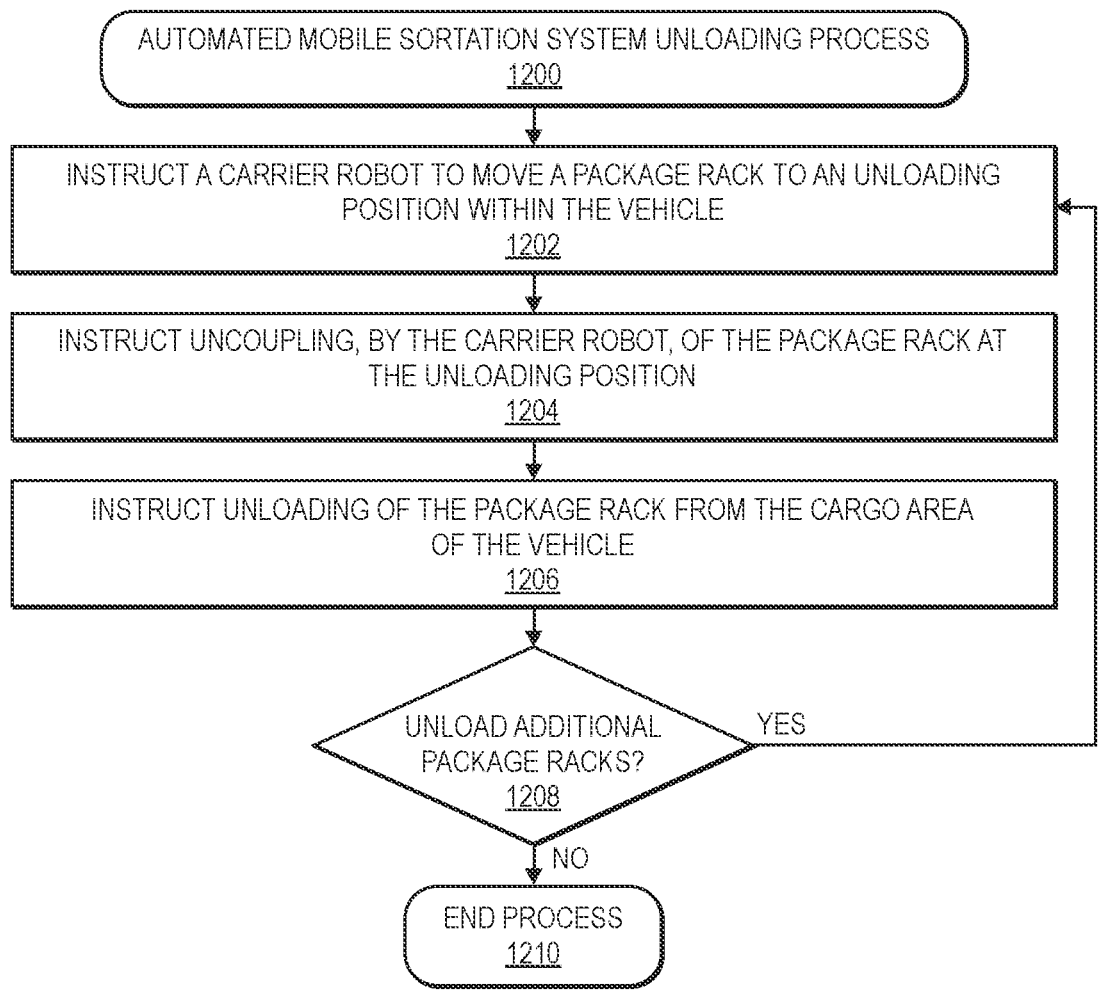
FIG. 12 is a flow diagram illustrating an example automated mobile sortation system unloading process, in accordance with implementations of the present disclosure.

FIG. 12 is a flow diagram illustrating an example automated mobile sortation system unloading process 1200, in accordance with implementations of the present disclosure.

The process 1200 may begin by instructing a carrier robot to move a package rack to an unloading position within a vehicle, as at 1202. For example, a carrier robot may move along the track system and thereby move an engaged package rack to a particular or desired position within the cargo area. In example embodiments, based on packages retrieved or delivered from within a package rack, e.g., completion of a delivery route or schedule, the package rack may be moved to an unloading position within the cargo area for removal or unloading from the vehicle. Further details of movement of package racks by carrier robots are described herein at least with respect to FIG. 13. As described herein, the unloading position may comprise a same position as the loading position for package racks within the cargo area. Further, a control system may instruct or command movement of the package rack by a carrier robot to an unloading position within the cargo area.

The process 1200 may continue by instructing uncoupling, by a carrier robot, of the package rack at the unloading position, as at 1204. For example, a carrier robot may move an engaged package rack to the unloading position via the track system. At the unloading position, one or more payload sleeves of the carrier robot may disengage or uncouple from one or more payload pins of the package rack. As described herein, the payload sleeves may comprise pipes, tubes, latches, hooks, or other connecting elements that may disengage or release the payload pins of the package rack. In example embodiments, the payload sleeves may be uncoupled from the payload pins using actuators associated with the carrier robot, and/or the payload sleeves may be uncoupled from the payload pins manually by associates. In this manner, the carrier robot may uncouple from the package rack, in order to remove or unload the package rack from within the cargo area. Further, a control system may instruct or command uncoupling of a carrier robot from the package rack.

The process 1200 may proceed by instructing unloading of the package rack from the cargo area of the vehicle, as a 1206. For example, a package rack may be moved, rolled, slid, lowered, or otherwise manipulated to be unloaded from a cargo area of a vehicle, e.g., via a rear access door of the cargo area. One or more lifts, ramps, platforms, or other supporting equipment or structures may be used to unload the package rack from the cargo area. In example embodiments, the package rack may be unloaded using automated or semi-automated machinery, robots, vehicles, or other equipment, and/or the package rack may be unloaded manually by associates. The package rack may be removed or unloaded from the unloading position within the cargo area, which may partially overlap an oversize package area toward a rear of the cargo area. Further, a control system may instruct or command unloading of a package rack from a cargo area of a vehicle.

The process 1200 may continue to determine whether to unload additional package racks, as at 1208. For example, a plurality of package racks may be unloaded from a cargo area of a vehicle following delivery of packages along a delivery route. In example embodiments, a cargo area may include nine positions arranged in a three-by-three grid, with eight positions having been loaded with package racks for delivery. Other example embodiments may include other numbers, configurations, or arrangements of loaded package racks. One or more package racks may be unloaded from the cargo area upon completion of a delivery route or schedule, and/or to facilitate loading of other package racks for delivery along another delivery route or schedule. Further, a control system may determine whether to unload additional package racks.

If it is determined that additional package racks are to be unloaded, the process 1200 may return to step 1202 to instruct unloading of an additional package rack. If, however, it is determined that no additional package racks are to be unloaded, the process 1200 may then end, as at 1210.

Figure 13:
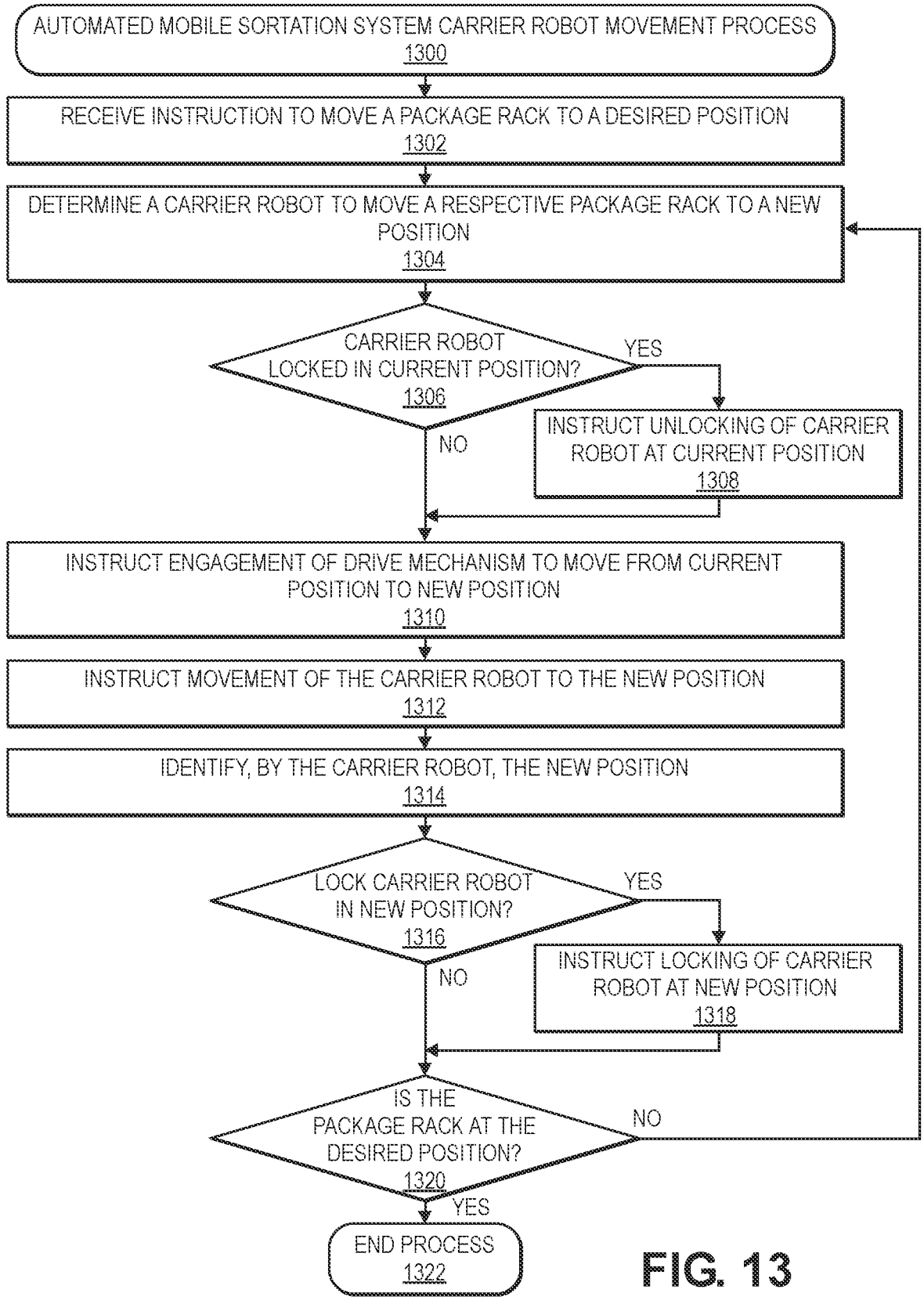
FIG. 13 is a flow diagram illustrating an example automated mobile sortation system carrier robot movement process, in accordance with implementations of the present disclosure.

FIG. 13 is a flow diagram illustrating an example automated mobile sortation system carrier robot movement process 1300, in accordance with implementations of the present disclosure.

The process 1300 may begin by receiving an instruction to move a package rack to a desired position, as at 1302. For example, a carrier robot may move an engaged package rack to any of various positions within a cargo area, including a loading or unloading position, a storage position, an access position, and/or other positions. The instruction may be associated with various processes described herein, including loading package racks, storing, sorting, or shuffling package racks, accessing package racks for delivery of loaded packages, unloading package racks, and/or various other processes. Further, a control system may receive an instruction to move a package rack to a desired position.

The process 1300 may continue by determining a carrier robot to move a respective package rack to a new position, as at 1304. For example, based on the instruction to move a package rack to a desired position, a carrier robot to move the package rack may be determined. In example embodiments, upon loading a package rack by a carrier robot into the cargo area, the carrier robot may remain engaged with the package rack until unloading of the package rack from the cargo area. In other example embodiments, a carrier robot may engage and load a package rack, disengage from the loaded package rack to engage and move or sort another package rack, disengage from the sorted package rack to engage and move another package rack to the access position, disengage from the package rack at the access position to engage and move a further package rack to an unloading position, and/or disengage and engage various package racks as desired to perform various processes described herein. As a result, a carrier robot may be determined or selected to move the package rack to a new position. In example embodiments, the new position may comprise an intermediate or relay position along a selected or determined path to the desired position, and/or the new position may coincide with the desired position. Further, a control system may determine a carrier robot to move a package rack to a new position.

The process 1300 may proceed by determining whether the carrier robot is locked in a current position, as at 1306. For example, one or more locking protrusions, features, or elements may be engaged or actuated to substantially lock or hold the carrier robot in a current position along the track system. The locking features may prevent unintended movement of carrier robots and/or engaged package racks as a result of travel or driving of the vehicle. Further, a control system may determine whether the carrier robot is locked in a current position.

If it is determined that the carrier robot is locked in the current position, the process 1300 may continue to instruct unlocking of the carrier robot at the current position, as at 1308. For example, the one or more locking protrusions, features, or elements may be actuated to disengage, unlock, or release the carrier robot at the current position along the track system. Upon unlocking the locking features, subsequent movement of the carrier robot and/or an engaged package rack may be enabled. Further, a control system may instruct or command unlocking of the carrier robot at the current position.

If, however, it is determined that the carrier robot is not locked in the current position, and/or upon instructing unlocking of the carrier robot at the current position, the process 1300 may proceed to instruct engagement of a drive mechanism to move the carrier robot from the current position to the new position, as at 1310. For example, as described herein, one or more drive mechanisms of a carrier robot may include drive engagement mechanisms to facilitate selective movement in first or second directions along the track system. In an example embodiment, the drive engagement mechanisms may comprise vertical engagement mechanisms to selectively engage a first set of drive wheels or a second set of drive wheels with portions of the track system. In another example embodiment, the drive engagement mechanisms may comprise rotatable engagement mechanisms to selectively rotate drive wheels between first and second rotational orientations and to cause engagement of the drive wheels with portions of the track system. The selection and engagement of the drive mechanisms may be determined based on a selected path from the current position to the new position for the carrier robot and engaged package rack. Further, a control system may instruct or command engagement of a drive mechanism to move from the current position to the new position.

The process 1300 may continue with instructing movement of the carrier robot to the new position, as at 1312. For example, a path from the current position to the new position may be determined or selected. Upon engaging a selected drive mechanism, the carrier robot may be instructed to move the package rack from the current position to the new position. Further, a control system may instruct or command movement of the carrier robot to the new position.

The process 1300 may proceed with identifying, by the carrier robot, the new position, as at 1314. For example, one or more imaging, scanning, or other sensors of the carrier robot may detect an identifier associated with the new position, e.g., a QR code, barcode, or other identifier associated with a portion of the cargo area and/or a portion of the track system. Upon identifying the new position by the carrier robot, an association between the carrier robot, the package rack, and the new position may be stored in memory. In this manner, package racks may be moved by carrier robots and monitored or tracked among a plurality of positions within a cargo area as desired. Further, a control system may instruct or command identification of the new position by the carrier robot.

The process 1300 may continue by determining whether to lock the carrier robot in the new position, as at 1316. For example, one or more locking protrusions, features, or elements may be engaged or actuated to substantially lock or hold the carrier robot in the new position along the track system. The locking features may prevent unintended movement of carrier robots and/or engaged package racks as a result of travel or driving of the vehicle. Further, a control system may determine whether to lock the carrier robot in the new position.

If it is determined that the carrier robot is to be locked in the new position, the process 1300 may proceed by instructing locking of the carrier robot at the new position, as at 1318. For example, the one or more locking protrusions, features, or elements may be actuated to engage, lock, or hold the carrier robot at the new position along the track system. Upon locking the locking features, subsequent movement of the carrier robot and/or an engaged package rack may be prevented. Further, a control system may instruct or command locking of the carrier robot at the new position.

If, however, it is determined that the carrier robot is not to be locked in the new position, and/or upon instructing locking of the carrier robot at the new position, the process 1300 may determine whether the package rack is at the desired position, as at 1320. In some example embodiments, the new position of the carrier robot and engaged package rack may not be the same as the desired position. For example, multiple movements of the carrier robot and engaged package rack may be required, potentially in combination with various movements, sortation, or shuffling of other carrier robots and associated package racks, in order to position the package rack at the desired position. Thus, in some examples, the new position may comprise an intermediate or relay position along a selected or determined path to the desired position. Whether a single movement or multiple movements of the carrier robot are instructed, however, the carrier robot may ultimately position the package rack at a new position that does coincide with or is the same as the desired position. Further, a control system may determine whether the package rack is at the desired position.

If it is determined that the package rack is not at the desired position, the process 1300 may return to step 1304 to determine a carrier robot to move the package rack to a next new position, e.g., along a selected or determined path to the desired position. If, however, it is determined that the package rack is at the desired position, the process 1300 may then end, as at 1322.

Figure 14:
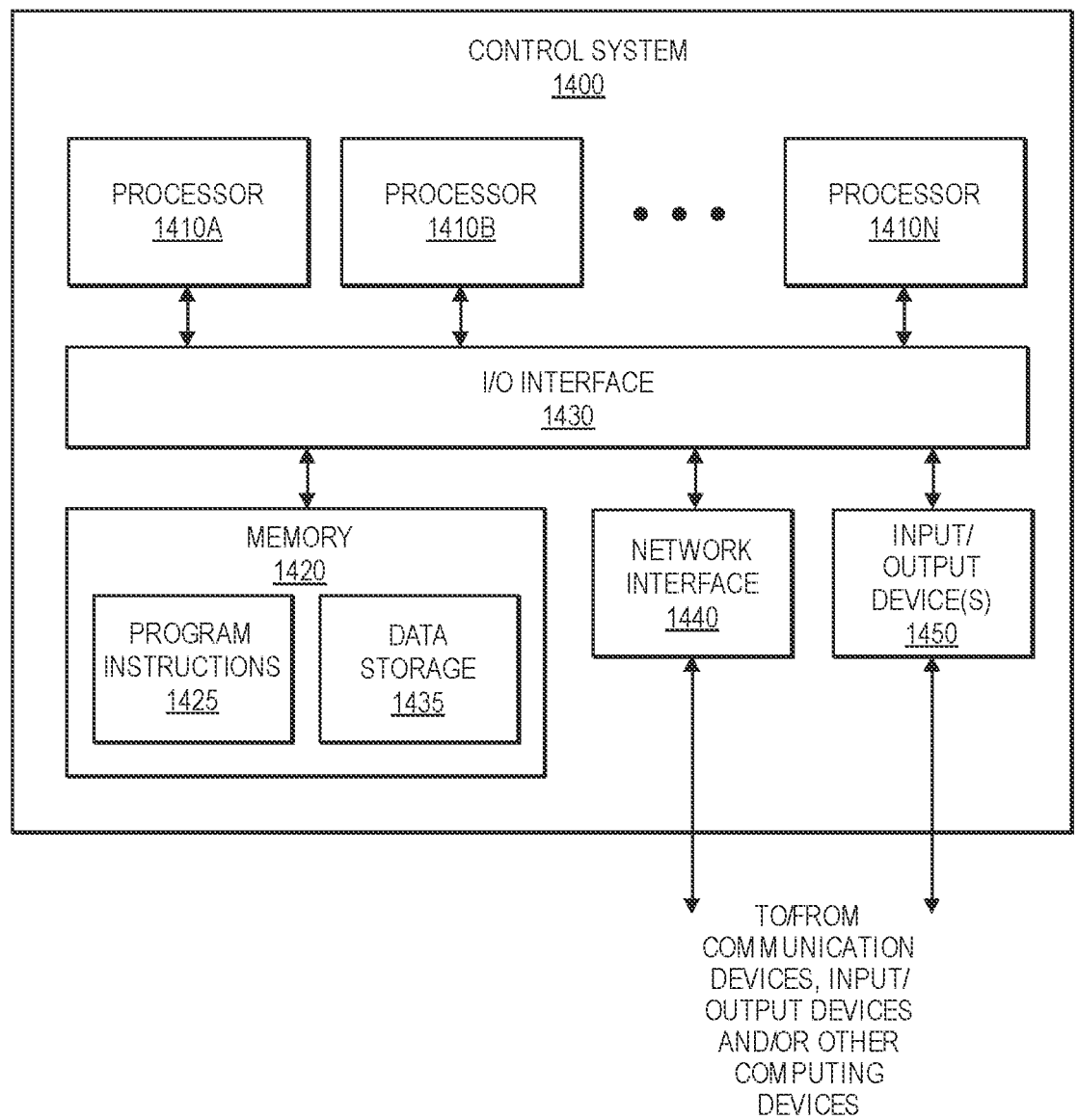
FIG. 14 is a block diagram illustrating various components of an example control system, in accordance with implementations of the present disclosure.

FIG. 14 is a block diagram illustrating an example control system 1400, in accordance with implementations of the present disclosure.

Various operations of a control system or controller, such as those described herein, may be executed on one or more computer systems, and/or interacting with various other computers, systems, or devices in a sortation center, distribution center, and/or material handling facility, according to various implementations. For example, the control system or controller discussed above may function and operate on one or more computer systems. One such control system is illustrated by the block diagram in FIG. 14. In the illustrated implementation, a control system 1400 includes one or more processors 1410A, 1410B through 1410N, coupled to a non-transitory computer-readable storage medium 1420 via an input/output (I/O) interface 1430. The control system 1400 further includes a network interface 1440 coupled to the I/O interface 1430, and one or more input/output devices 1450. In some implementations, it is contemplated that a described implementation may be implemented using a single instance of the control system 1400 while, in other implementations, multiple such systems or multiple nodes making up the control system 1400 may be configured to host different portions or instances of the described implementations. For example, in one implementation, some data sources or services (e.g., related to portions of automated mobile sortation and delivery systems, operations, or processes, etc.) may be implemented via one or more nodes of the control system 1400 that are distinct from those nodes implementing other data sources or services (e.g., related to other portions of automated mobile sortation and delivery systems, operations, or processes, etc.).

In various implementations, the control system 1400 may be a uniprocessor system including one processor 1410A, or a multiprocessor system including several processors 1410A-1410N (e.g., two, four, eight, or another suitable number). The processors 1410A-1410N may be any suitable processor capable of executing instructions. For example, in various implementations, the processors 1410A-1410N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1410A-1410N may commonly, but not necessarily, implement the same ISA.

The non-transitory computer-readable storage medium 1420 may be configured to store executable instructions and/or data accessible by the one or more processors 1410A-

1410N. In various implementations, the non-transitory computer-readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1420 as program instructions 1425 and data storage 1435, respectively. In other implementations, program instructions and/or data may be received, sent or stored upon different types of computer-accessible media, such as non-transitory media, or on similar media separate from the non-transitory computer-readable storage medium 1420 or the control system 1400. Generally speaking, a non-transitory, computer-readable storage medium may include storage media or memory media such as magnetic or optical media, e.g., disk or CD/DVD-ROM, coupled to the control system 1400 via the I/O interface 1430. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1440.

In one implementation, the I/O interface 1430 may be configured to coordinate I/O traffic between the processors 1410A-1410N, the non-transitory computer-readable storage medium 1420, and any peripheral devices, including the network interface 1440 or other peripheral interfaces, such as input/output devices 1450. In some implementations, the I/O interface 1430 may perform any necessary protocol, timing or other data transformations to convert data signals from one component (e.g., non-transitory computer-readable storage medium 1420) into a format suitable for use by another component (e.g., processors 1410A-1410N). In some implementations, the I/O interface 1430 may include support for devices attached through various types of peripheral buses, such as a variant of the Peripheral Component Interconnect (PCI) bus standard or the Universal Serial Bus (USB) standard, for example. In some implementations, the function of the I/O interface 1430 may be split into two or more separate components, such as a north bridge and a south bridge, for example. Also, in some implementations, some or all of the functionality of the I/O interface 1430, such as an interface to the non-transitory computer-readable storage medium 1420, may be incorporated directly into the processors 1410A-1410N.

The network interface 1440 may be configured to allow data to be exchanged between the control system 1400 and other devices attached to a network, such as other control systems, sortation center, distribution center, and/or material handling system controllers, warehouse management systems, automated machinery, robots, equipment, or other systems, carrier robots, vehicle navigation systems, delivery routing or scheduling systems, other computer systems, various types of sensors, various types of vision systems, imaging devices, or imaging sensors, other material handling systems or equipment, or between nodes of the control system 1400. In various implementations, the network interface 1440 may support communication via wired or wireless general data networks, such as any suitable type of Ethernet network.

Input/output devices 1450 may, in some implementations, include one or more displays, monitors, touchscreens, projection devices, other visual input/output devices, speakers, microphones, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1400. Multiple input/output devices 1450 may be present in the control system 1400 or may be distributed on various nodes of the control system 1400. In some implementations, similar input/output devices may be separate from the control system 1400 and may interact with one or more nodes of the control system 1400 through a wired or wireless connection, such as over the network interface 1440.

As shown in FIG. 14, the memory 1420 may include program instructions 1425 that may be configured to implement one or more of the described implementations and/or provide data storage 1435, which may comprise various tables, data stores and/or other data structures accessible by the program instructions 1425. The program instructions 1425 may include various executable instructions, programs, or applications to facilitate automated mobile sortation and delivery operations and processes described herein, such as vehicle controllers, drivers, or applications, carrier robot controllers, drivers, or applications, visual input/output device controllers, drivers, or applications, sensor controllers, drivers, or applications, sensor data processing applications, vision system or imaging device controllers, drivers, or applications, imaging data processing applications, material handling equipment controllers, drivers, or applications, etc. The data storage 1435 may include various data stores for maintaining data related to systems, operations, or processes described herein, such as vehicles, visual input/output devices, cargo areas and associated positions, package racks, package trays, packages, track or rail systems, carrier robots, drive mechanisms, drive engagement mechanisms, locking features or elements, payload sleeves and payload pins, various sensors described herein, sensor data, various identifiers described herein, stored associations among components and/or identifiers described herein, delivery routes or schedules, delivery destinations, etc.

Those skilled in the art will appreciate that the control system 1400 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1400 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 10-13, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated mobile sortation system, comprising:
   a vehicle comprising a cargo area having a plurality of positions;
   a rail system positioned proximate a roof of the cargo area, the rail system defining the plurality of positions by a plurality of tracks that extend among the plurality of positions, and a plurality of slots that extend between the plurality of tracks, wherein the plurality of tracks and the plurality of slots are arranged as a static grid;
   a plurality of carrier robots configured to move among the plurality of positions via the rail system; and
   a plurality of package racks that are engaged and moved by respective carrier robots of the plurality of carrier robots, wherein the plurality of package racks include respective payload pins positioned on upper surfaces of the plurality of package racks via which respective carrier robots are configured to engage individual package racks of the plurality of package racks.

2. The automated mobile sortation system of claim 1, wherein the cargo area of the vehicle further comprises an oversize package area positioned toward a rear of the vehicle; and
   wherein a portion of the rail system extends over the oversize package area toward a loading and unloading position of the plurality of positions of the cargo area.

3. The automated mobile sortation system of claim 1, wherein the plurality of positions of the cargo area includes an access position that is positioned toward a front of the vehicle; and
   wherein the access position permits access to one or more packages of a package rack positioned at the access position.

4. The automated mobile sortation system of claim 3, wherein the vehicle further comprises a visual input/output device positioned proximate the access position; and
   wherein the visual input/output device is configured to provide instructions related to delivery of the one or more packages of the package rack positioned at the access position.

5. The automated mobile sortation system of claim 1, wherein respective packages are stored within the plurality of package racks based on at least one of a size, height, weight, delivery route, or delivery destination.

6. A system, comprising:
   a track system positioned proximate a roof within a cargo area of a vehicle, the track system defining a plurality of positions by a plurality of tracks that extend among the plurality of positions, and a plurality of slots that extend between the plurality of tracks, wherein the plurality of tracks and the plurality of slots are arranged as a static grid;
   at least one carrier robot configured to move within the cargo area via the track system; and an item rack that is engaged and moved within the cargo area by the at least one carrier robot, wherein the item rack includes a payload pin positioned on an upper surface of the item rack.

7. The system of claim 6, wherein the at least one carrier robot comprises a plurality of carrier robots; and
wherein the plurality of carrier robots are configured to move among the plurality of positions via the track system.

8. The system of claim 6, wherein the plurality of positions include a loading or unloading position toward a rear of the vehicle and an access position toward a front of the vehicle; and
wherein a respective identifier is associated with individual positions of the plurality of positions.

9. The system of claim 6, wherein the item rack comprises a movable structure having a plurality of lateral faces, one face of the plurality of lateral faces permitting access to an interior of the item rack;
wherein the item rack receives an item tray within the interior, and the item tray receives an item; and
wherein an identifier is associated with and positioned on an upper surface of the item rack.

10. The system of claim 6, wherein the at least one carrier robot comprises a body, a drive mechanism, and a payload sleeve; and
wherein the payload sleeve of the at least one carrier robot couples with the payload pin of the item rack.

11. The system of claim 10, wherein the drive mechanism comprises a first drive mechanism and a second drive mechanism positioned above the track system;
wherein the first drive mechanism includes a first engagement mechanism configured to move the first drive mechanism between a first raised position and a first lowered position relative to a first set of the plurality of tracks;
wherein, in the first lowered position, the first drive mechanism is configured to move the at least one carrier robot in a first direction along the first set of the plurality of tracks;
wherein the second drive mechanism includes a second engagement mechanism configured to move the second drive mechanism between a second raised position and a second lowered position relative to a second set of the plurality of tracks;
wherein, in the second lowered position, the second drive mechanism is configured to move the at least one carrier robot in a second direction along the second set of the plurality of tracks; and
wherein the first and second directions are substantially orthogonal to each other.

12. The system of claim 11, wherein the at least one carrier robot further comprises a locking protrusion on an underside of the body;
wherein the track system includes a plurality of locking apertures at the plurality of positions; and
wherein, in the first raised position of the first drive mechanism and in the second raised position of the second drive mechanism, the locking protrusion engages with a respective locking aperture.

13. The system of claim 10, wherein the drive mechanism comprises a plurality of drive wheels positioned below the track system;
wherein the plurality of drive wheels include an engagement mechanism configured to move the plurality of drive wheels between a raised position and a lowered position relative to the plurality of tracks;
wherein the plurality of drive wheels are rotatable between a first orientation and a second orientation;
wherein, in the first orientation and in the raised position, the plurality of drive wheels are configured to move the at least one carrier robot in a first direction along the plurality of tracks;
wherein, in the second orientation and in the raised position, the plurality of drive wheels are configured to move the at least one carrier robot in a second direction along the plurality of tracks; and
wherein the first and second directions are substantially orthogonal to each other.

14. A method, comprising:
instructing movement of an item rack by a first carrier robot from a storage position to an access position within a cargo area of a vehicle;
wherein the first carrier robot moves along a track system proximate a roof within the cargo area, the track system defining a plurality of positions by a plurality of tracks that extend among the plurality of positions, and a plurality of slots that extend between the plurality of tracks, wherein the plurality of tracks and the plurality of slots are arranged as a static grid;
wherein the first carrier robot is configured to engage and move the item rack within the cargo area;
wherein the item rack includes a payload pin positioned on an upper surface of the item rack; and
wherein at the access position, an interior of the item rack is accessible by an associate.

15. The method of claim 14, further comprising:
prior to instructing movement of the item rack by the first carrier robot to the access position:
instructing movement of the first carrier robot to a loading position within the cargo area;
instructing engagement of the item rack by the first carrier robot at the loading position; and
instructing movement of the item rack by the first carrier robot from the loading position to the storage position within the cargo area;
wherein at the storage position, the interior of the item rack is not accessible by the associate.

16. The method of claim 14, further comprising:
subsequent to instructing movement of the item rack by the first carrier robot to the access position:
instructing movement of a second item rack by a second carrier robot from a second storage position to the storage position within the cargo area; and
wherein the second carrier robot is configured to engage and move the second item rack within the cargo area.

17. The method of claim 16, further comprising:
instructing movement of the item rack by the first carrier robot from the access position to a third storage position within the cargo area; and
instructing movement of the second item rack by the second carrier robot from the storage position to the access position within the cargo area.

18. The method of claim 14, further comprising:
instructing movement of the item rack by the first carrier robot to an unloading position within the cargo area; and
instructing disengagement of the item rack by the first carrier robot at the unloading position.

* * * * *